United States Patent
Sanftleben et al.

(10) Patent No.: US 9,079,465 B1
(45) Date of Patent: Jul. 14, 2015

(54) TRAILER HITCH ACCESSORIES

(71) Applicant: Oregon Made Plastic Products Inc., Canby, OR (US)

(72) Inventors: Jeffrey Allen Sanftleben, Canby, OR (US); Kenneth Anthony Olcott, Woodburn, OR (US)

(73) Assignee: Oregon Made Plastic Products, Inc., Canby, OR (US)

( * ) Notice: Subject to any disclaimer, the term of this patent is extended or adjusted under 35 U.S.C. 154(b) by 0 days.

(21) Appl. No.: 13/841,429

(22) Filed: Mar. 15, 2013

Related U.S. Application Data

(60) Provisional application No. 61/641,879, filed on May 2, 2012.

(51) Int. Cl.
  *B60D 1/58* (2006.01)
  *B60D 1/60* (2006.01)

(52) U.S. Cl.
  CPC . *B60D 1/58* (2013.01); *B60D 1/605* (2013.01)

(58) Field of Classification Search
  USPC ...................................... 280/457, 480, 480.1
  See application file for complete search history.

(56) References Cited

U.S. PATENT DOCUMENTS

| | | | |
|---|---|---|---|
| 2,671,675 A | 1/1950 | Swaisgood | |
| 3,125,355 A * | 3/1964 | Snuggins | 280/457 |
| 3,228,445 A | 1/1966 | Mayotte | |
| 3,596,926 A | 8/1971 | Randall | |
| 4,157,189 A | 6/1979 | Poley | |
| 4,230,333 A | 10/1980 | Persyn | |
| 4,416,319 A * | 11/1983 | Hofmann | 152/213 R |
| 4,558,495 A | 12/1985 | Olsen | |
| 4,955,968 A | 9/1990 | Beckerer, Jr. | |
| 5,037,122 A | 8/1991 | Beckerer, Jr. | |
| 5,242,422 A | 9/1993 | Schneberger et al. | |
| 5,407,219 A | 4/1995 | Chiu | |
| 5,421,601 A | 6/1995 | Hinze et al. | |
| 5,566,965 A * | 10/1996 | Applegate | 280/500 |
| 5,658,804 A | 8/1997 | Hayashikura | |
| D388,382 S * | 12/1997 | Williams | D12/162 |
| D388,384 S * | 12/1997 | Williams | D12/162 |
| 5,802,888 A | 9/1998 | Parsons | |
| 5,918,896 A * | 7/1999 | Jenkins, Jr. | 280/457 |
| 6,039,339 A | 3/2000 | Bello | |
| 6,083,016 A | 7/2000 | Waynick, Sr. | |
| 6,151,761 A | 11/2000 | Thompson | |
| 6,179,317 B1 | 1/2001 | Hurst et al. | |
| 6,217,054 B1 * | 4/2001 | Klimek et al. | 280/511 |
| 6,412,876 B2 | 7/2002 | Nishide | |
| 6,539,589 B2 | 4/2003 | Thompson | |
| 6,644,679 B1 | 11/2003 | Warren | |
| 6,832,775 B1 * | 12/2004 | Muller | 280/507 |
| 7,637,525 B2 * | 12/2009 | Rightmire | 280/480 |
| D628,128 S | 11/2010 | Sanders et al. | |

(Continued)

OTHER PUBLICATIONS

Eastern Marine, web page, http://www.easternmarine.com/hitch-ball-cover-50080233, at least as early as Feb. 8, 2014, 1 page.

(Continued)

*Primary Examiner* — Kevin Hurley
(74) *Attorney, Agent, or Firm* — Law Office of Karen Dana Oster, LLC

(57) ABSTRACT

Chain-up accessories, utility tether accessories, utility pad accessories, seven-way connector cap accessories, and hitch ball cap accessories are accessories for use with trailer hitches disclosed herein.

31 Claims, 29 Drawing Sheets

(56) References Cited

U.S. PATENT DOCUMENTS

| | | | |
|---|---|---|---|
| D629,366 S | 12/2010 | Ericson et al. | |
| 7,857,342 B2 * | 12/2010 | Holtan et al. | 280/416.1 |
| 7,954,515 B2 | 6/2011 | Gerst | |
| 8,172,249 B2 * | 5/2012 | Trubody | 280/507 |
| D666,133 S * | 8/2012 | In | D12/223 |
| 2003/0085548 A1 | 5/2003 | Morgan | |
| 2007/0234524 A1 | 10/2007 | Witt | |
| 2009/0039617 A1 * | 2/2009 | Klyeman | 280/504 |
| 2009/0200771 A1 | 8/2009 | Prine | |
| 2010/0025965 A1 | 2/2010 | Caldwell | |
| 2013/0014351 A1 | 1/2013 | Kuglen et al. | |

OTHER PUBLICATIONS

World Wide Marine LLC, Steersman steering guard, webpage, http://www.steersman.com/html/products.html, at least as early as Oct. 28, 2014, Houston, Texas, 2 pages.

* cited by examiner

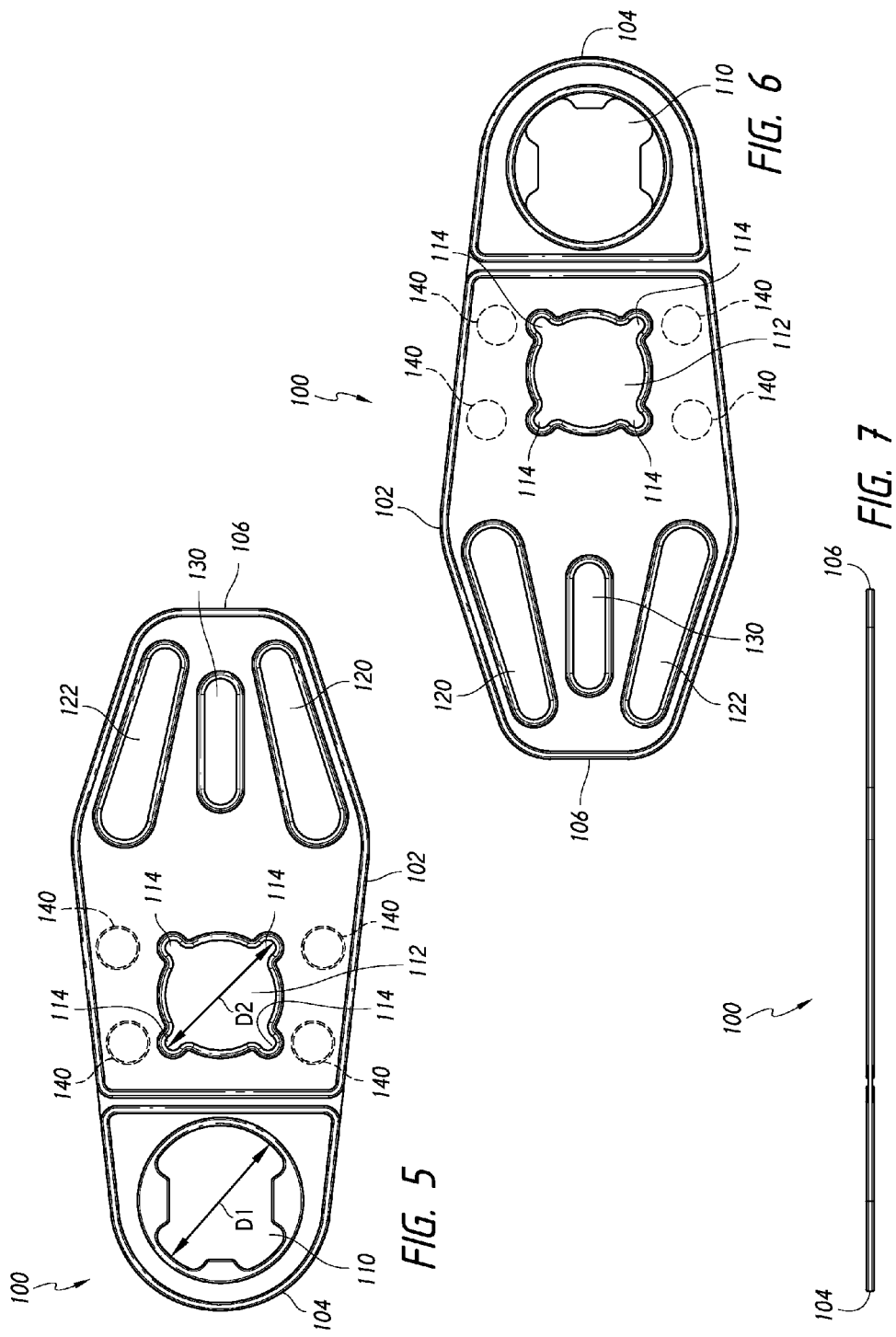

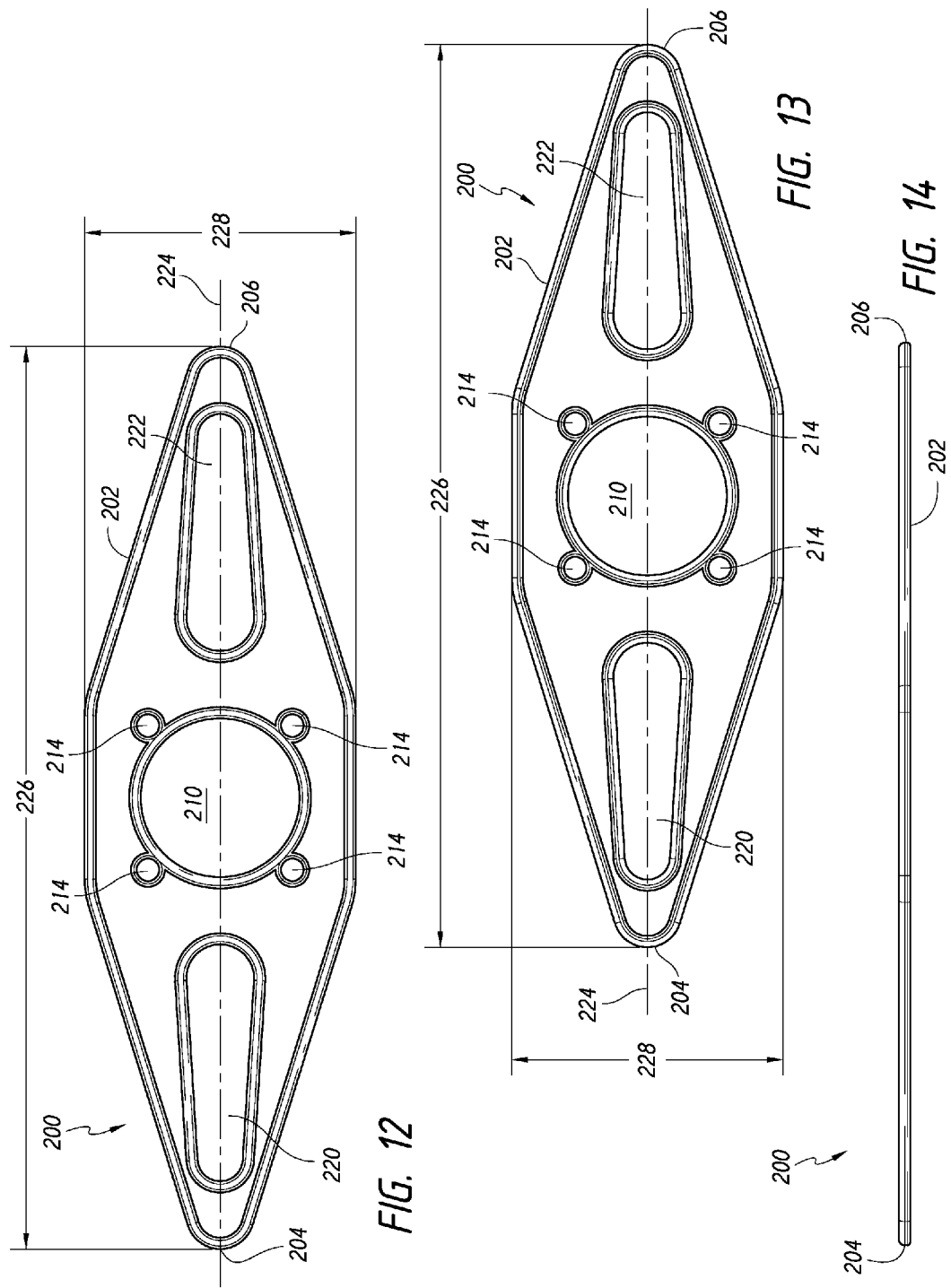

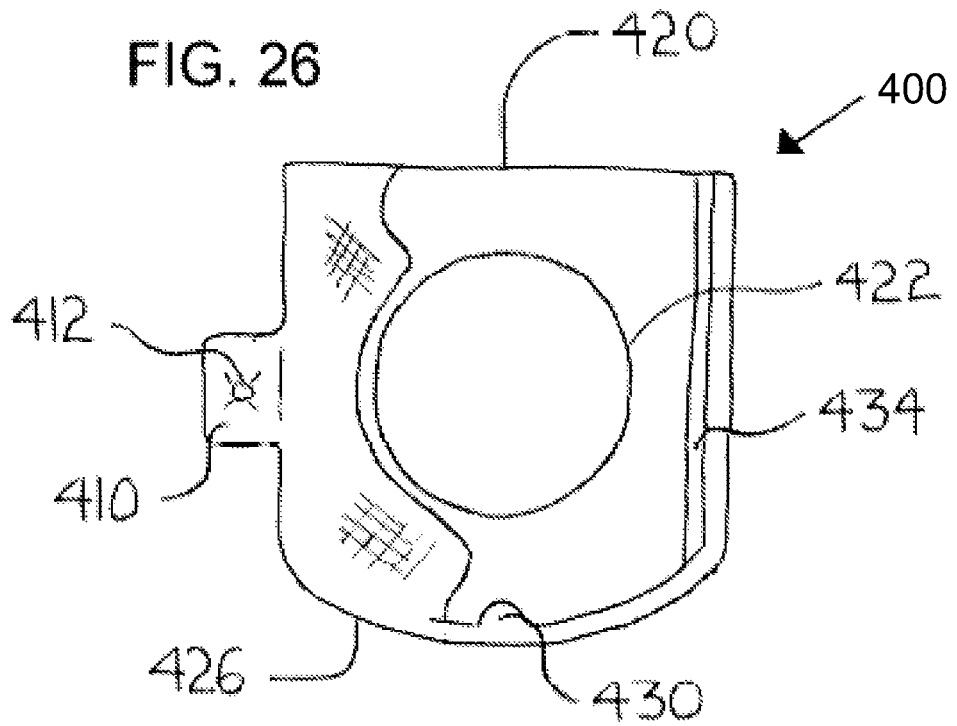
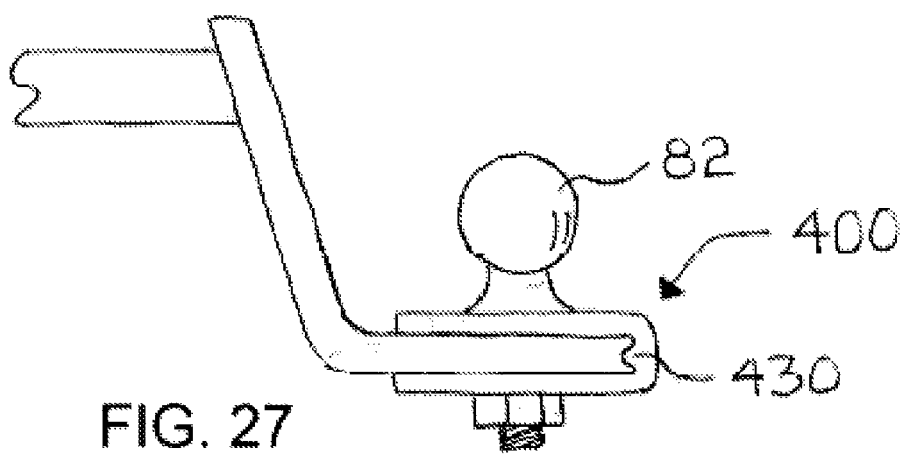

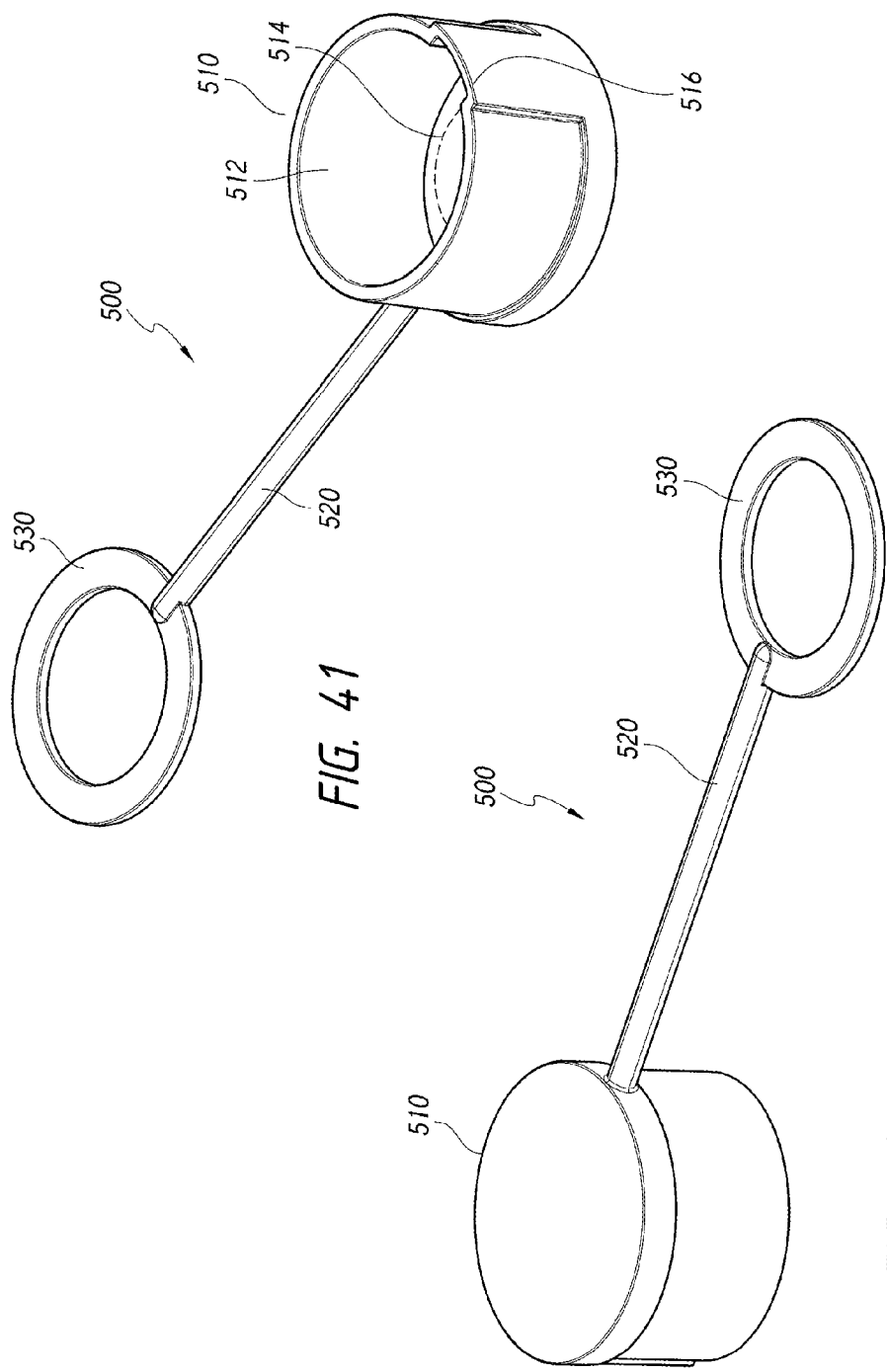

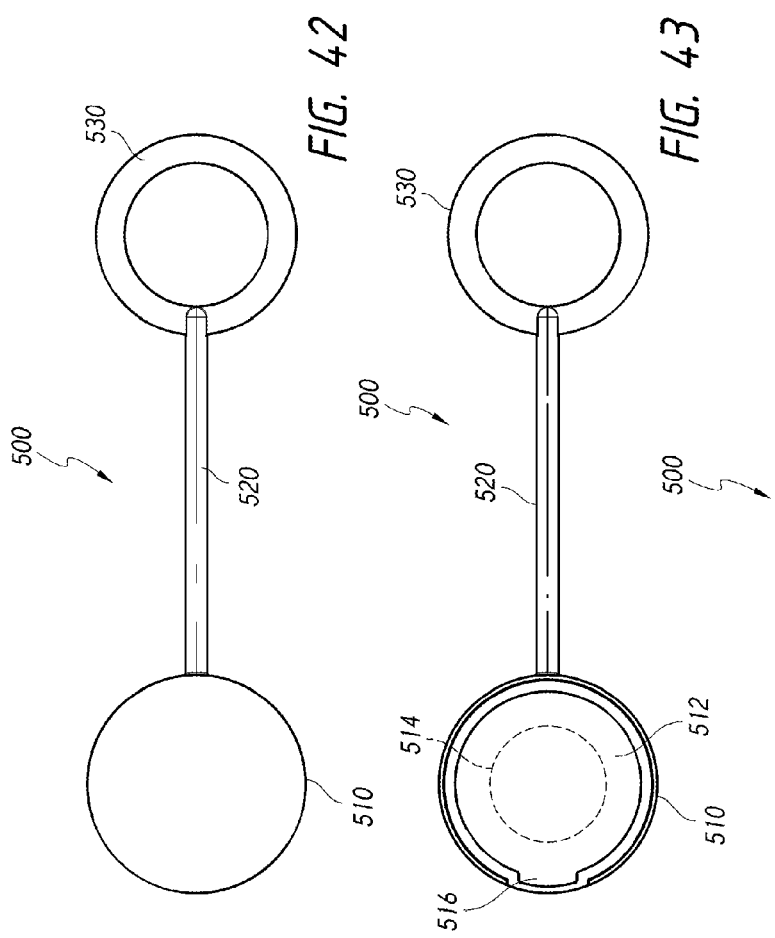
FIG. 42
FIG. 43
FIG. 44
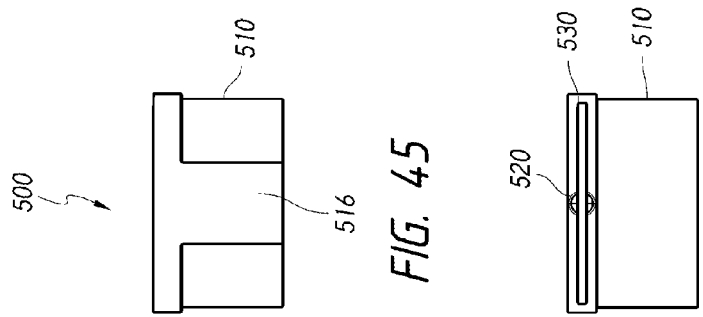
FIG. 45
FIG. 46

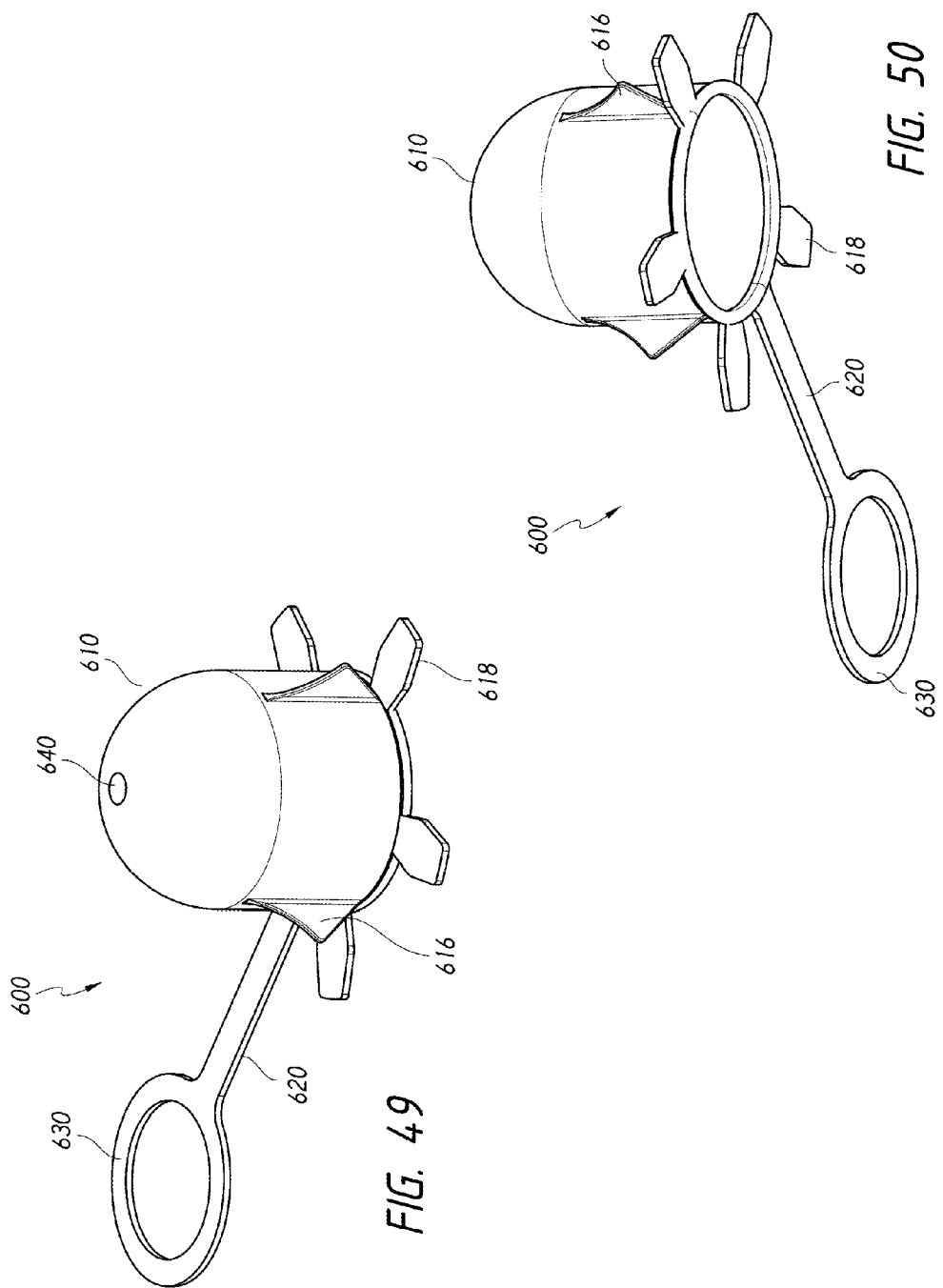

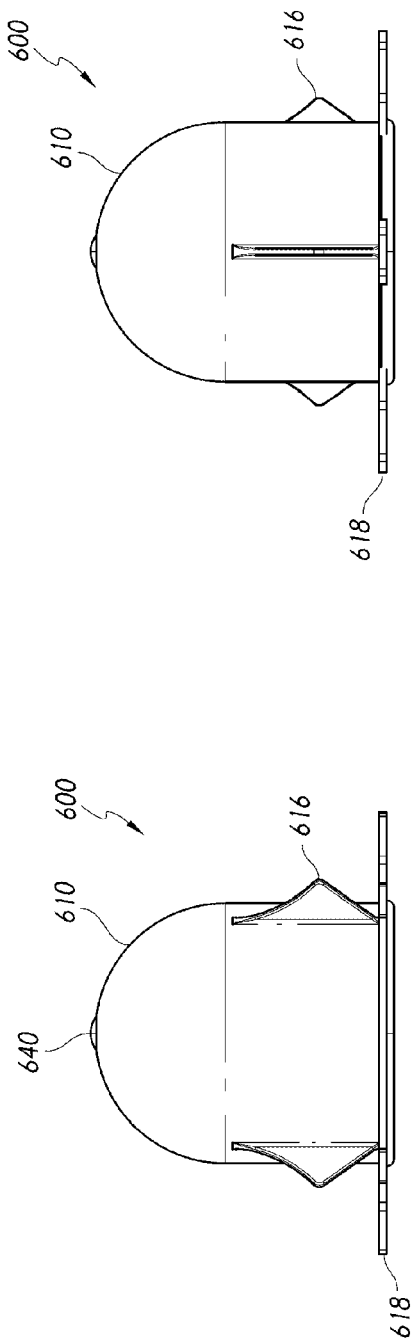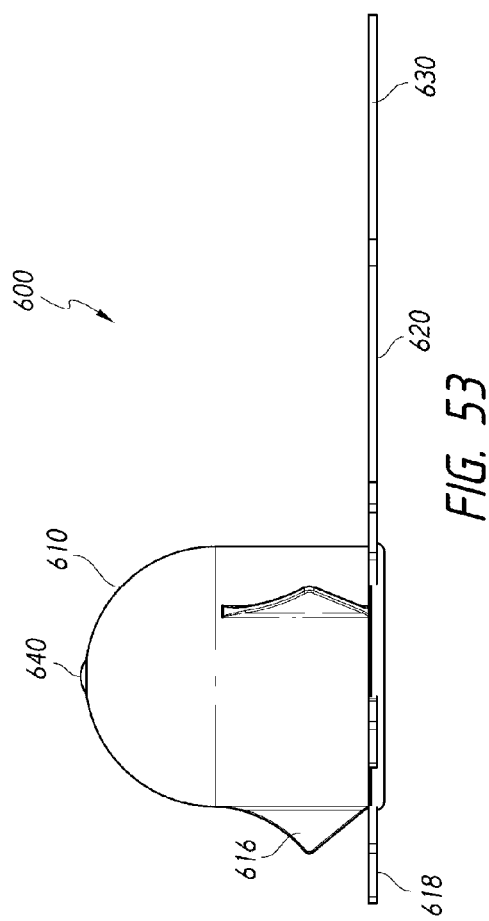

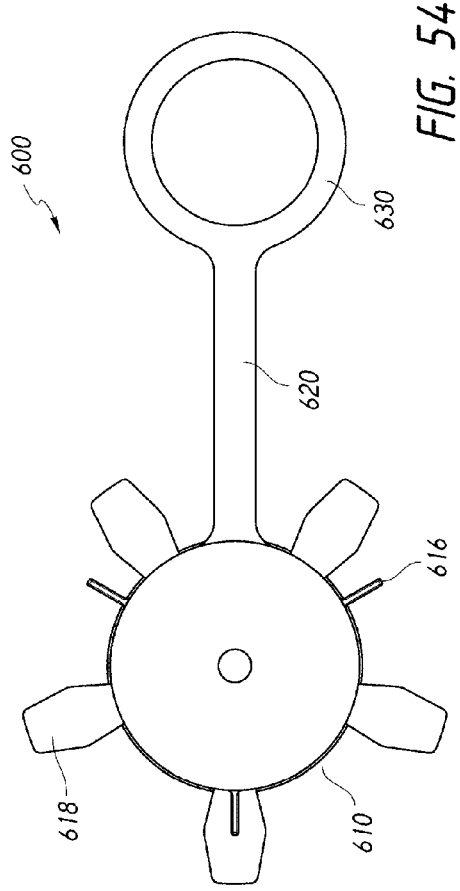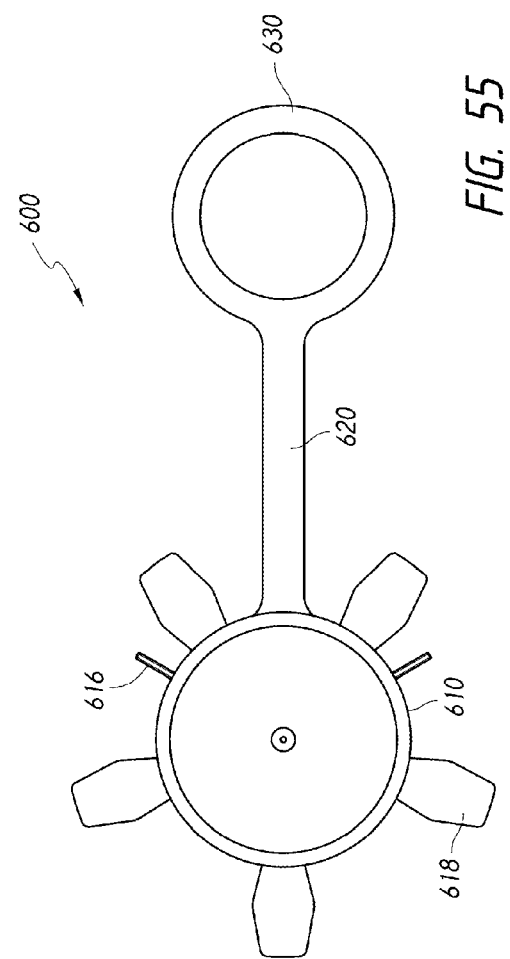
FIG. 54
FIG. 55

TRAILER HITCH ACCESSORIES

The present application is an application claiming the benefit of U.S. Provisional Patent Application Ser. No. 61/641,879, filed May 2, 2012. The present application is based on and claims priority from this application, the disclosure of which is hereby expressly incorporated herein by reference in its entirety.

BACKGROUND OF THE INVENTION

Described herein are accessories for use with trailer hitches including, for example, chain-up accessories, utility tether accessories, utility pad accessories, seven-way connector cap accessories, and hitch ball cap accessories.

Often it is necessary to tow or pull (referred to generically as "tow") a "trailer" behind a "tow vehicle" (or just "vehicle"). The tow vehicle may be, for example, a family vehicle (e.g. a car or a truck), a recreation vehicle (e.g. a camper), a commercial vehicle, or any vehicle means known or yet to be discovered having suitable power and structure to tow a trailer. The trailer may be, for example, a utility trailer, a box trailer, an open trailer, an enclosed trailer, a boat trailer, a horse trailer, a travel trailer, a tent trailer, a flatbed trailer, a vehicle with a tow bar, a car dolly, a cargo trailer, or any trailer means known or yet to be discovered suitable for being towed by or behind a tow vehicle.

A "trailer hitch" (sometimes referred to as a "tow hitch") is a device that attaches to a tow vehicle providing the connection between the tow vehicle and the trailer. Exemplary trailer hitches include, but are not limited to, ball hitches (hitches having trailer hitch ball mounts), stingers, tow hitches, or other connecting means known or yet to be discovered for connecting tow vehicles and trailers. Even among similar types of trailer hitches there is great variation (e.g. there are many trailer hitch ball mounts of different shapes and/or drop lengths on the market). Generally a trailer hitch has two components, one associated with the tow vehicle and one associated with the trailer. Functionally joining or connecting the tow vehicle component of the trailer hitch with the trailer component of the trailer hitch allows the tow vehicle and the trailer to be interconnected.

Various problems are associated with operation and attachment (electrical and mechanical) of a trailer to a tow vehicle via a trailer hitch. The problems may include, but are not limited to, dragging of safety chains on the ground during towing, dragging of wires during towing, impact of a user's shin against a ball hitch, corrosion of a trailer connecting plug, and/or wear of the trailer towing hitch ball.

Patents that may be relevant to each of the trailer hitch accessories are described in the accessory-specific sections of the Detailed Description.

BRIEF SUMMARY OF THE INVENTION

Described herein are accessories for use with trailer hitches including, for example, chain-up accessories, utility tether accessories, utility pad accessories, seven-way connector cap accessories, and hitch ball cap accessories.

Disclosed herein is a chain-up accessory for holding at least one trailer safety chain associated with a tow vehicle and trailer. The chain-up accessory preferably includes: a body having a first end and a second end; at least one hitch ball aperture defined in the body between the first end and the second end; and at least one chain aperture defined in the body between the first end and the second end.

Preferably the chain-up accessory holds the trailer safety chain inserted through the at least one chain aperture.

Preferably the body is a flexible body, an elongated body, a wide elongated body, and/or a narrow elongated body. Preferably the chain-up accessory includes at least one accommodation for accommodating hitch balls of different sizes.

Preferably the at least one hitch ball aperture is two hitch ball apertures. A first hitch ball aperture may be positioned towards the first end, and a second hitch ball aperture may be positioned generally centrally in the body.

At least one chain aperture may be positioned between the at least one hitch ball aperture and either the first end or the second end.

Preferably the at least one chain aperture is two chain apertures. The two chain apertures may be positioned between the at least one hitch ball aperture and one of the first end or the second end. Alternatively, a first chain aperture may be positioned between the at least one hitch ball and the first end, and the second chain aperture may be positioned between the at least one hitch ball aperture and the second end.

The chain-up accessory may also include at least one wire aperture. If the at least one chain aperture is two chain apertures, then the at least one wire aperture may be positioned between the two chain apertures.

Also disclosed herein is a chain-up accessory for holding at least one trailer safety chain associated with a tow vehicle and trailer that includes: a body having a first end and a second end; a first hitch ball aperture and a second hitch ball aperture defined in the body between the first end and the second end, the first hitch ball aperture is positioned towards the first end, and the second hitch ball aperture positioned generally centrally in the body; and a first chain aperture and a second chain aperture defined in the body between the first end and the second end, the at least one chain aperture positioned between the second hitch ball aperture and the second end. The chain-up accessory preferably holds the trailer safety chain inserted through the at least one chain apertures.

Also disclosed herein is a chain-up accessory for holding at least one trailer safety chain associated with a tow vehicle and trailer that includes: a body having a first end and a second end; at least one hitch ball aperture defined in the body between the first end and the second end; and a first chain aperture and a second chain aperture defined in the body, the first chain aperture positioned between the at least one hitch ball and the first end, the second chain aperture positioned between the at least one hitch ball aperture and the second end. The chain-up accessory preferably holds the trailer safety chain inserted through the at least one of the chain apertures.

The subject matter described herein is particularly pointed out and distinctly recited in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings illustrate various exemplary trailer hitch accessories and/or provide teachings by which the various exemplary trailer hitch accessories are more readily understood.

FIG. 5 is a top plan view of the first preferred chain-up accessory taken from the top.

FIG. 6 is a bottom plan view of the first preferred chain-up accessory taken from the bottom.

FIG. 7 is a side view of the first preferred chain-up accessory taken from the bottom.

FIG. 12 is a top plan view of the second preferred chain-up accessory taken from the top.

FIG. 13 is a bottom plan view of the second preferred chain-up accessory taken from the bottom.

FIG. 14 is a side view of the second preferred chain-up accessory taken from the bottom.

FIG. 26 is a top plan view with partial cut-away of an exemplary utility pad accessory.

FIG. 27 is a cross-sectional side view of the exemplary utility pad accessory installed on a hitch ball mount.

FIG. 40 is a perspective top view of the seven-way connector cap accessory.

FIG. 41 is a perspective bottom view of the seven-way connector cap accessory.

FIG. 42 is a plan top view of the exemplary seven-way connector cap accessory.

FIG. 43 is a plan bottom view of the exemplary seven-way connector cap accessory.

FIG. 44 is a first side view of the exemplary seven-way connector cap accessory, the second side view being a mirror image thereof.

FIG. 45 is a front view of the exemplary seven-way connector cap accessory.

FIG. 46 is a back view of the exemplary seven-way connector cap accessory.

FIG. 49 is a perspective top view of the hitch ball cap accessory in a second configuration.

FIG. 50 is a perspective bottom view of the hitch ball cap accessory in a second configuration.

FIG. 51 is a front view of the exemplary hitch ball cap accessory in the second configuration.

FIG. 52 is a back view of the exemplary hitch ball cap accessory in the second configuration.

FIG. 53 is a first side view of the exemplary hitch ball cap accessory in the second configuration, the second side view being a mirror image thereof.

FIG. 54 is a top view of the hitch ball cap accessory in the second configuration.

FIG. 55 is a bottom view of the hitch ball cap accessory in the second configuration.

Figure 1:
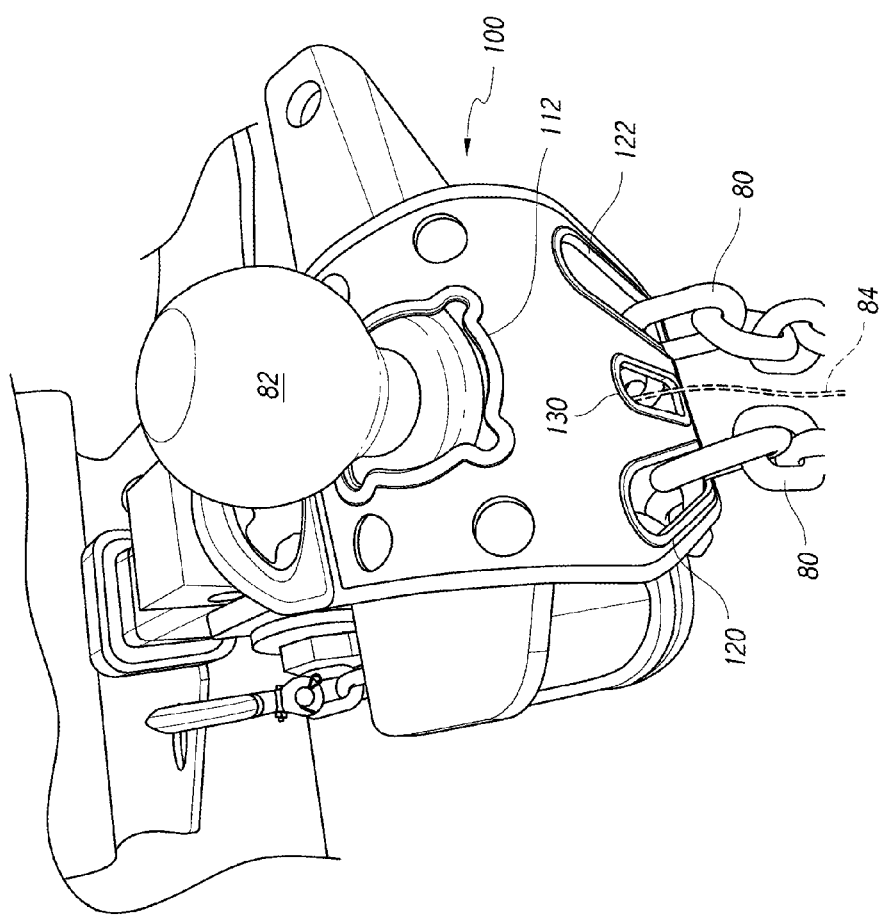
FIG. 1 is a perspective front view of a first preferred chain-up accessory attached to a hitch ball with the trailer safety chains secured within respective chain apertures.

The drawings are not necessarily to scale. Certain features or components herein may be shown in somewhat schematic form and some details of conventional elements may not be shown or described in the interest of clarity and conciseness. The drawings are hereby incorporated in and constitute a part of this specification.

DETAILED DESCRIPTION OF THE INVENTION

Described herein are accessories for use with trailer hitches including, for example, chain-up accessories, utility tether accessories, utility pad accessories, seven-way connector cap accessories, and hitch ball cap accessories. Exemplary trailer hitch accessories may be better understood with reference to the drawings, but these various trailer hitch accessories are not intended to be of a limiting nature.

DEFINITIONS

Before describing the various trailer hitch accessories and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

The term "associated" is defined to mean integral or original, retrofitted, attached (permanently or temporarily), connected (including functionally connected), positioned near, and/or accessible by. For example, if an accessory (or other component) is associated with a trailer hitch, the accessory may be an attached accessory that is attached to the tow vehicle or trailer, an original accessory built into the tow vehicle or trailer, an accessory that has been retrofitted into the tow vehicle or trailer, and/or a nearby accessory that is positioned near the tow vehicle or trailer.

Unless specifically stated otherwise, the terms "first," "second," and "third" are meant solely for purposes of designation and not for order or limitation. For example, the "first preferred exemplary accessory" has no order relationship with the "second preferred exemplary accessory."

It should be noted that the terms "may," "might," "can," and "could" are used to indicate alternatives and optional features and only should be construed as a limitation if specifically included in the claims. For example, the phrase "the accessory may have a feature" indicates that the feature is optional. It should be noted that the various components, features, steps, or embodiments thereof are all "preferred" whether or not it is specifically indicated. Claims not including a specific limitation should not be construed to include that limitation.

Unless specifically stated otherwise, the term "exemplary" is meant to indicate an example, representative, and/or illustration of a type. The term "exemplary" does not necessarily mean the best or most desired of the type. For example, an "exemplary accessory" is just one example of an accessory, but other accessories could be just as desirable.

It should be noted that relative terms (e.g. primary and secondary) are meant to help in the understanding of the technology and are not meant to limit the scope of the invention. Similarly, the term "front" is meant to be relative to the term "back" and the term "top" is meant to be relative to the term "bottom." It should be further noted that although the accessories are described in terms of modules (modular components), the terms are not meant to be limiting.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes" and "has" mean "comprises" (e.g. a device that includes, has, or comprises A and B contains A and B, but optionally may contain C or additional components other than A and B). It should be noted that, unless otherwise specified, the singular forms "a," "an," and "the" refer to one or more than one, unless the context clearly dictates otherwise.

Chain-Up Accessory:

Most states require trailer safety chains while a tow vehicle is towing a trailer. A common problem with trailer safety chains is incorrect length. This is also exaggerated by the variation in trailer hitches (e.g. trailer hitches of different shapes and/or drop lengths) on the market. It is common for the user to adjust the trailer safety chains by twisting the trailer safety chains to the desired length to prevent the trailer safety chains from dragging on the ground during towing. This is accomplished by a best guess of the user for how much twisting is needed to keep the trailer safety chains up while not affecting the turning radius. Other problems with the trailer safety chains dragging on the ground include, for example, sparks and premature wear. Sparking from the dragging of the chain may cause fires. Premature wear may make the trailer safety chains ineffective or greatly reduce the load capacity should the trailer come unhooked from the tow vehicle.

The exemplary chain-up accessories 100, 200 may be used for towing many different types of trailers (e.g. utility, pull-camper, boat, box, flatbed, travel, tent trailer, vehicle with a tow bar, car dolly, and cargo trailer) and tow vehicles. The chain-up accessories 100, 200 described herein are preferably used to hold the trailer safety chains 80 up during towing to prevent dragging the trailer safety chains 80 on the ground. In other words, the chain-up accessories 100, 200 described herein keep the trailer safety chains 80 up and off the ground during towing and while the trailer is not in use (which helps to prevent rust and corrosion of the safety chains 80).

Further, the chain-up accessories 100, 200 keep the trailer safety chains 80 set for the user each time the trailer is used so little or no adjustment is needed. The user hooks the trailer safety chains 80 to the tow vehicle and adjusts for trailer safety chain height and length. The chain-up accessory 100, 200 can remain on the trailer when the trailer is not in use. Then, when the user uses the trailer the next time, the trailer safety chains 80 are set to the same height and length as the last time the trailer was used.

Figure 2:
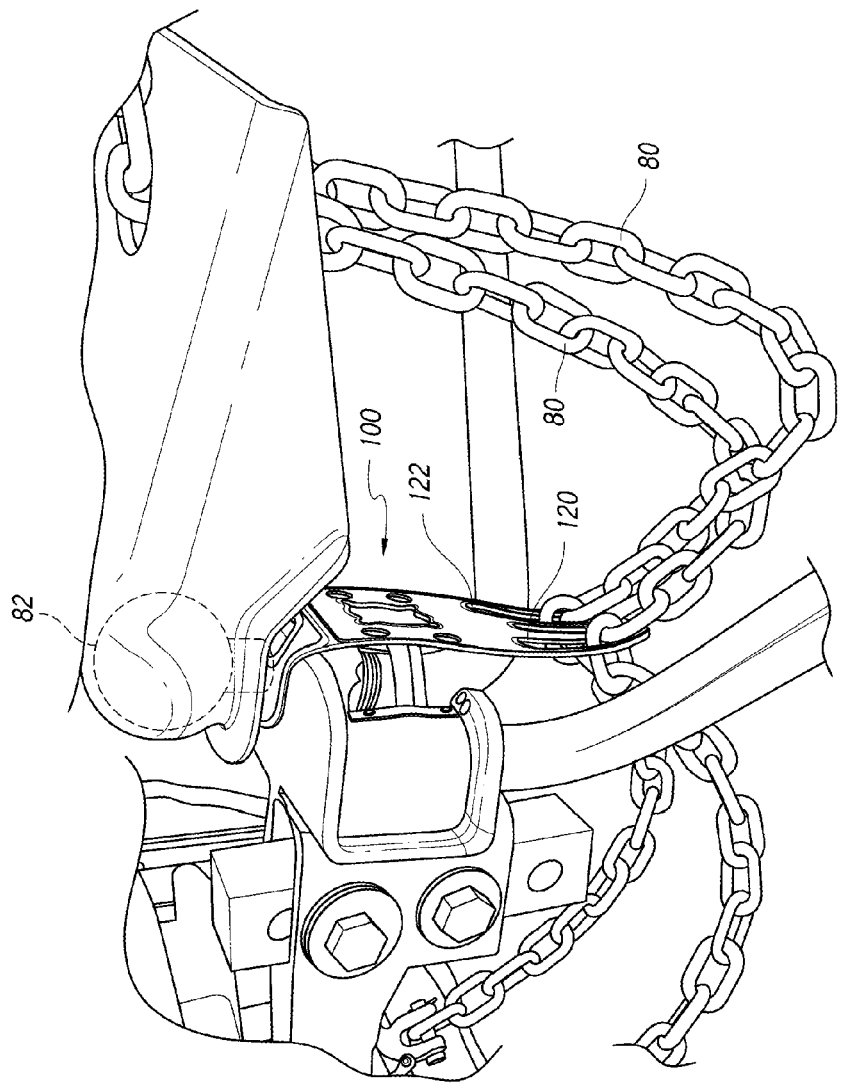
FIG. 2 is a perspective side view of the first preferred chain-up accessory attached to a hitch ball with the trailer safety chains secured within respective chain apertures.
Figure 3:
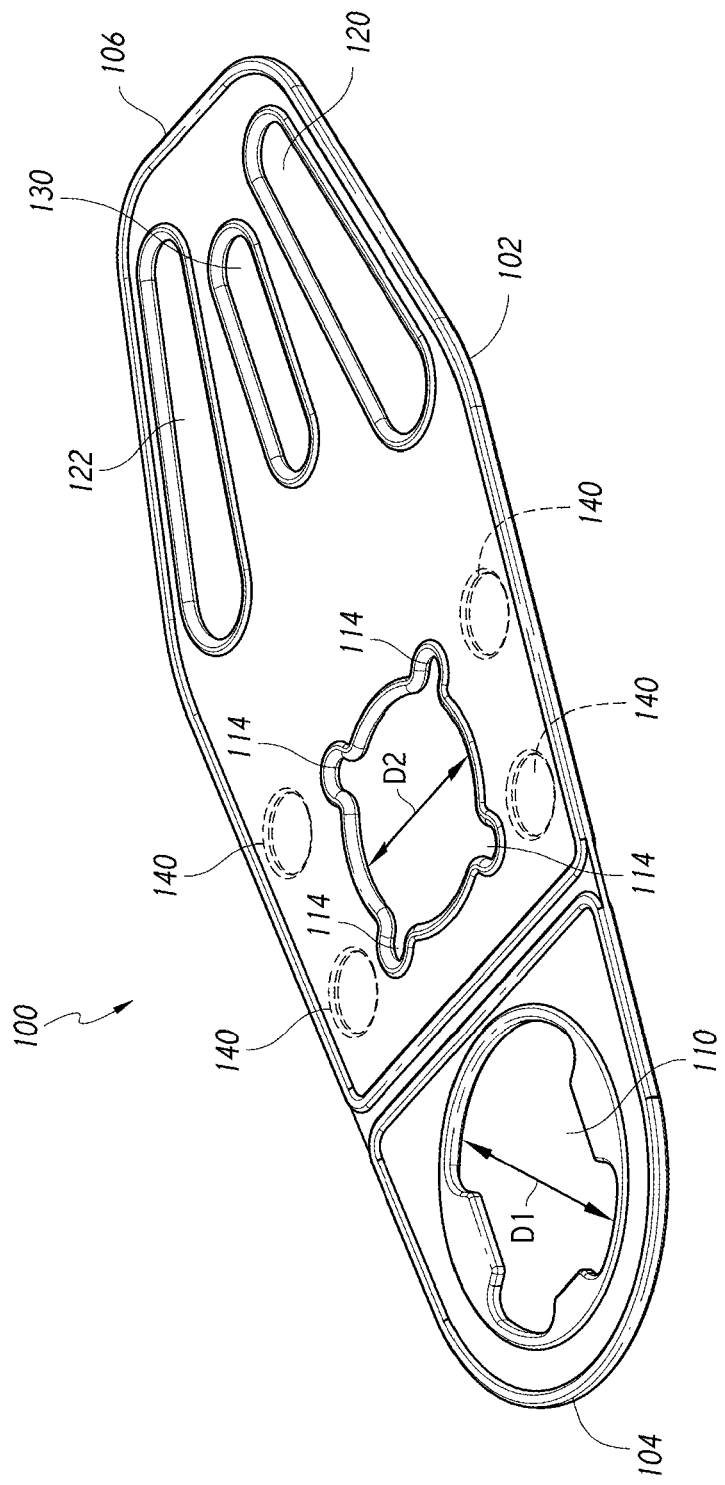
FIG. 3 is a perspective view of the first preferred chain-up accessory taken from the top.
Figure 4:
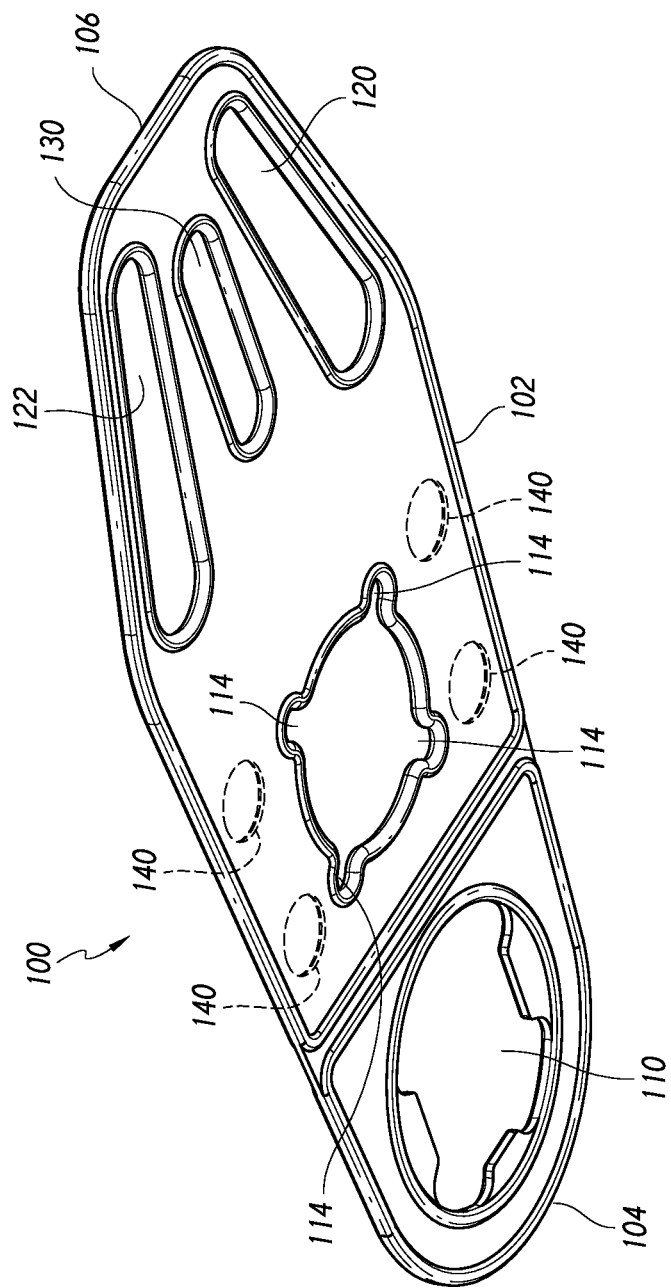
FIG. 4 is a perspective view of the first preferred chain-up accessory taken from the bottom.

FIGS. 1-7 show a first preferred chain-up accessory 100 having an exemplary "wide" elongated body 102 with a first end 104 and a second end 106. The first and second hitch ball apertures 110, 112 are shown as a first generally circular opening towards the first end 104 and a second generally circular opening more centrally located in the wide elongated body 102. Further, toward the second end 106 of the first preferred chain-up accessory 100, there are first and second chain apertures 120, 122 with a wire aperture 130 disposed therebetween. FIGS. 1 and 2 show the first preferred chain-up accessory 100 attached to a hitch ball 82 with the trailer safety chains 80 secured within respective first and second chain apertures 120, 122. FIGS. 3-7 show the substantially flat "at rest" (when it is not in use) configuration of the first preferred chain-up accessory 100.

The first and second hitch ball apertures 110, 112 are preferably designed to fit at least one trailer hitch ball 82 and, preferably, many trailer hitch balls 82 of different sizes. (U.S. Pat. Nos. 6,644,679, 6,179,317, and 4,157,189 disclose exemplary tow hitches and their disclosures are incorporated herein by reference.) Because trailer hitch balls 82 come in many standard sizes (e.g. standard tri-ball mounts including 1⅞ inch, 2 inch, and 2 5/16 inch diameter hitch balls), the first preferred chain-up accessory 100 preferably provides one or more accommodations for the different sizing including, but not limited to, the following exemplary accommodations: (1) having first and second hitch ball apertures 110, 112 of differing sizes (e.g. diameter D1 is different than diameter D2); (2) providing cutouts 114 for at least one hitch ball aperture 110, 112, the cutouts 114 having "flaps" formed therebetween that bend to increase the size of the hitch ball apertures 110, 112 and to return to their "flat" position to return the hitch ball apertures 110, 112 to their regular size; and (3) using a material that has some "stretch." An example of having hitch ball apertures 110, 112 of differing sizes is shown by first hitch ball aperture 110 having a relatively large diameter D1 to accommodate a larger trailer hitch ball 82 as compared to the second hitch ball aperture 112 with a relatively small diameter D2. An example of providing cutouts 114 is shown as the cutouts 114 (shown as four substantially semi-circular cutouts) of second hitch ball aperture 112, the cutouts 114 being positioned around the circumference (shown as evenly spaced) of the main circle of the second hitch ball aperture 112. The second hitch ball aperture 112, therefore, is shown as having four "flaps" between the cutouts 114. As such, the diameter of the second hitch ball aperture 112 may be adjusted by bending the four flaps so that the second hitch ball aperture 112 may be fitted around various sized hitch balls 82. In alternative first chain-up accessories 100, neither of the ball apertures 110, 112 have cutouts or both of the ball apertures 110, 112 have cutouts. There also can be more or fewer cutouts 114 (and flaps). Examples of materials that have some "stretch" from which the first preferred chain-up accessory 100 may be made include, but are not limited to, rubber, a synthetic elastomeric material, or any other material known or yet to be discovered that is durable, flexible, and otherwise suitable for the purposes disclosed herein. (It should be noted that alternative first preferred chain-up accessory 100 not having this accommodation may be made from alternative materials that do not provide any "stretch.") Although first preferred chain-up accessories 100 have one or more of these accommodations, alternative first preferred chain-up accessories 100 have no accommodations (e.g. sized to fit a specific hitch ball 82) or additional accommodations (e.g. those disclosed herein).

The first and second chain apertures 120, 122 are preferably openings through which the trailer safety chains 80 may be fed. The chain apertures 120, 122 are shown as being elongated, tapered, and designed with one end (e.g. an end furthest from the hitch ball apertures) narrower in width so as to capture the chain(s) 80 and prevent them from sliding during use. These characteristics are meant to be exemplary and not to limit the scope of the invention. For example, the chain apertures 120, 122 are not necessarily elongated, tapered, and/or narrower at one end.

The wire aperture 130 is preferably an opening through which wires 84 (e.g. a brake cable and/or electrical wires) may be fed. The wire aperture 130 is shown as a non-tapered, elongated opening. In alternative chain-up accessories, the chain apertures may be tapered and/or may not be elongated.

Optional spacer openings 140 are shown in phantom because they are optional. The main reason for the spacer openings 140 relates to the reduction of material costs. The quantity of spacer openings 140 is variable (more or fewer spacer openings 140 may be included in other alternate first chain-up accessories 100). The size of the spacer openings 140 is variable (the spacer openings 140 may be larger or smaller). The location of the spacer openings 140 is variable (for example, spacer openings 140 may be positioned between the hitch ball aperture 112 and the second chain apertures 120).

FIG. 1 shows the first chain-up accessory associated with a standard tow hitch. When using a standard hitch ball 82 for towing (e.g. 1⅞ inch, 2 inch, and 2 5/16 inch diameter hitch balls), the second hitch ball aperture 110 is fitted around the hitch ball 82 and the trailer safety chains 80 are inserted through and held up by the chain apertures. Further, wires 84 (e.g. a brake cable and/or electrical wires) may be inserted through and held by the wire aperture 130. It should be noted that the safety chains and/or the wires are preferably held substantially directly below the hitch ball 82 and are preferably suspended away from the ground to prevent dragging.

FIG. 2 shows the first chain-up accessory associated with a weight distribution tow hitch. The weight distribution tow hitch includes two outrigger bars and a wide base upon which the hitch ball 82 is mounted. The first hitch ball aperture 110 is fitted around the hitch ball 82 and the trailer safety chains 80 are inserted through the end held up by the chain apertures. Further, although not shown, wires 84 (e.g. a brake cable and/or electrical wires) may be inserted through and held by the wire aperture (not shown). It should be noted that the safety chains and/or the wires are preferably held substantially directly below the hitch ball 82 and are preferably suspended away from the ground to prevent dragging.

Figure 8:
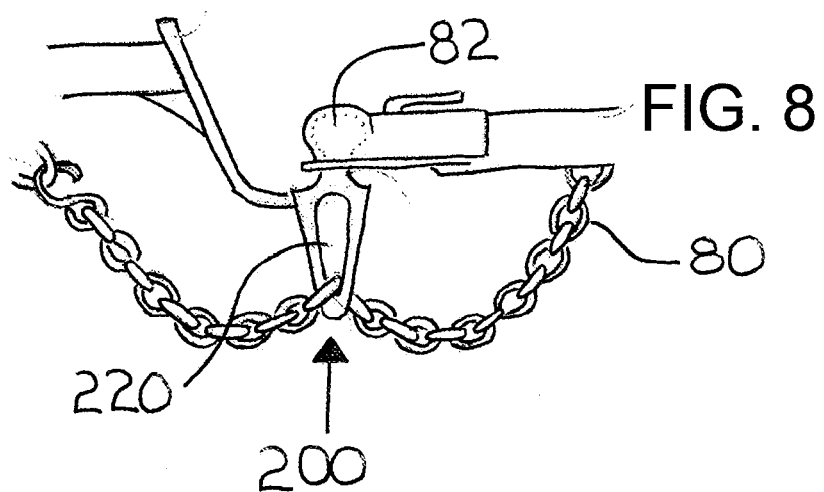
FIG. 8 is a side view of a second preferred chain-up accessory attached to a hitch ball with a trailer safety chain secured within at least one chain aperture.
Figure 9:
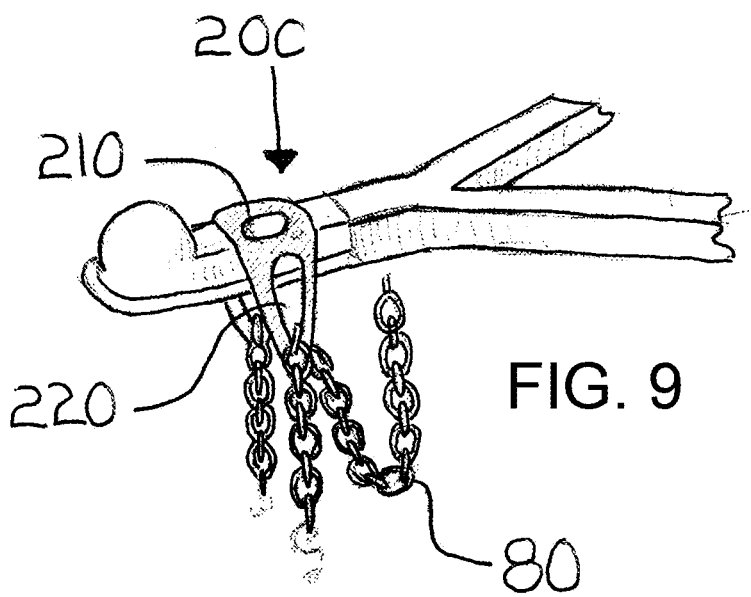
FIG. 9 is a perspective side view of the second preferred chain-up accessory removed from the hitch ball with the trailer safety chains secured within the chain apertures.
Figure 10:
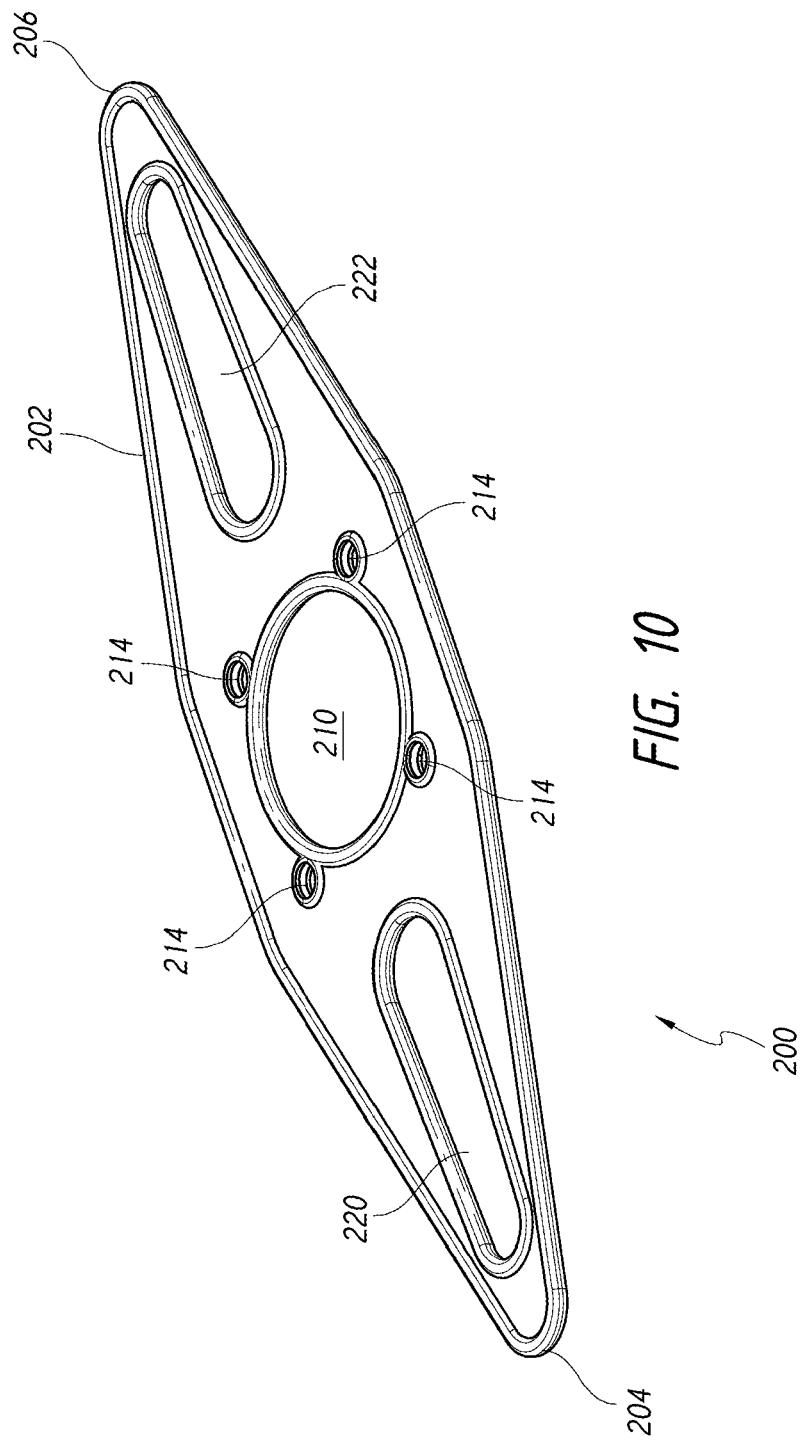
FIG. 10 is a perspective view of the second preferred chain-up accessory taken from the top.
Figure 11:
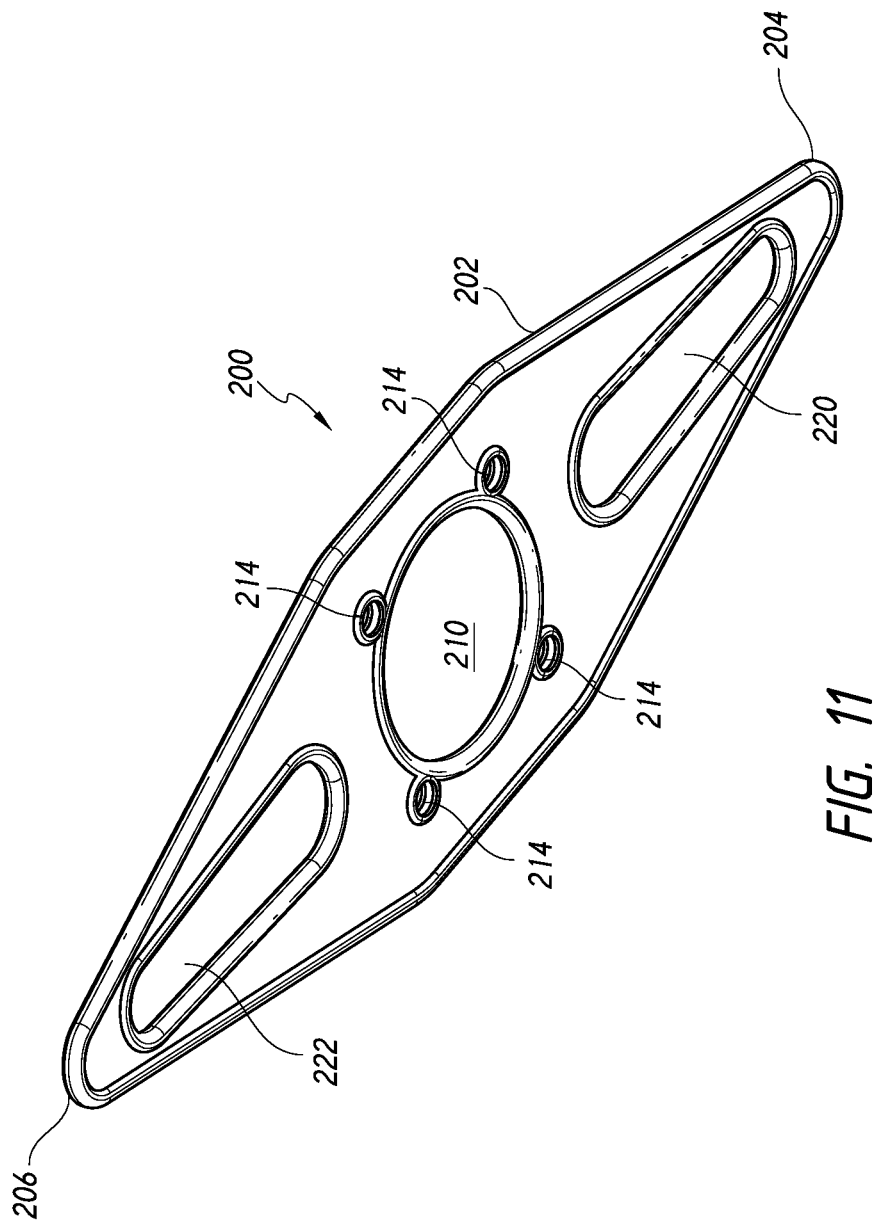
FIG. 11 is a perspective view of the second preferred chain-up accessory taken from the bottom.
Figure 16:
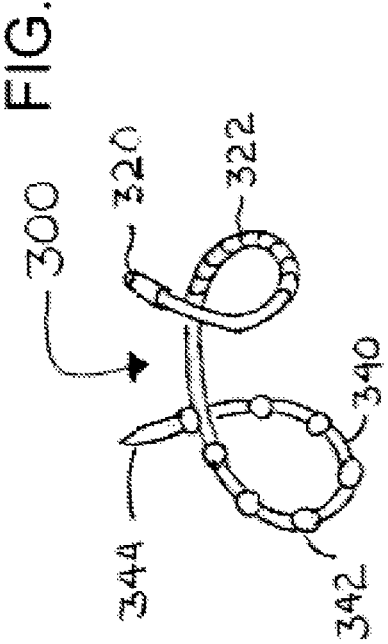
FIG. 16 is a side view of the exemplary utility tether accessory forming a double loop.
Figure 15:
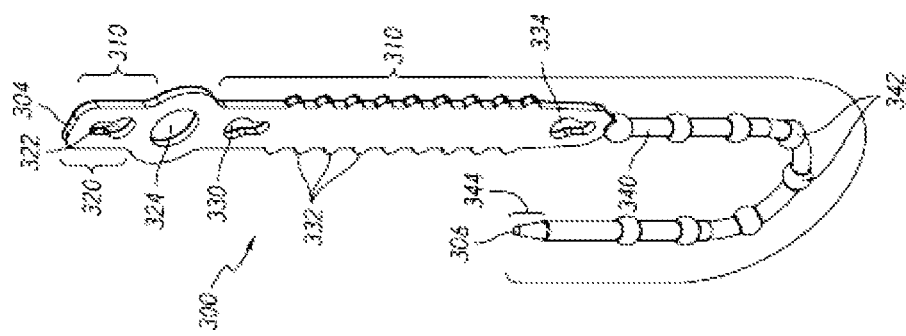
FIG. 15 is a perspective view of an exemplary utility tether accessory.
Figure 17:
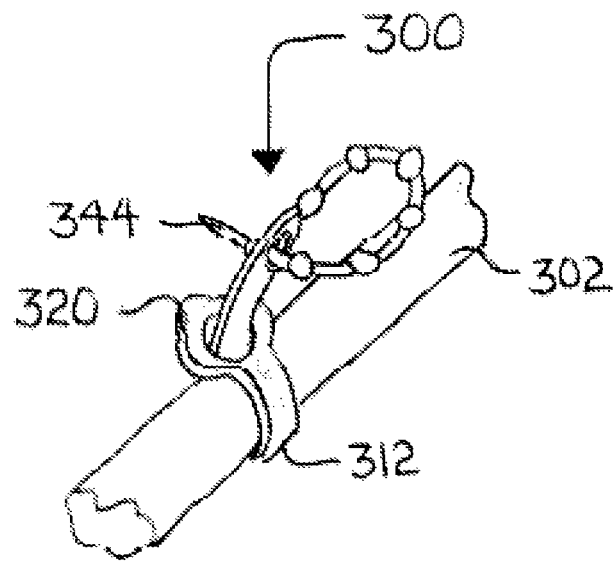
FIG. 17 is a perspective view of the exemplary utility tether accessory forming a double loop, one loop wrapped around wire.
Figure 18:
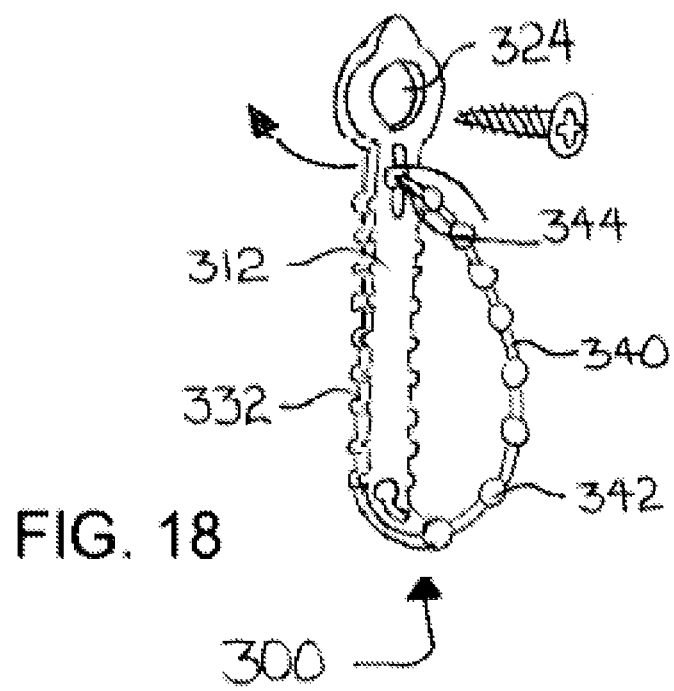
FIG. 18 is a perspective view of the exemplary utility tether accessory used in an alternative configuration.
Figure 19:
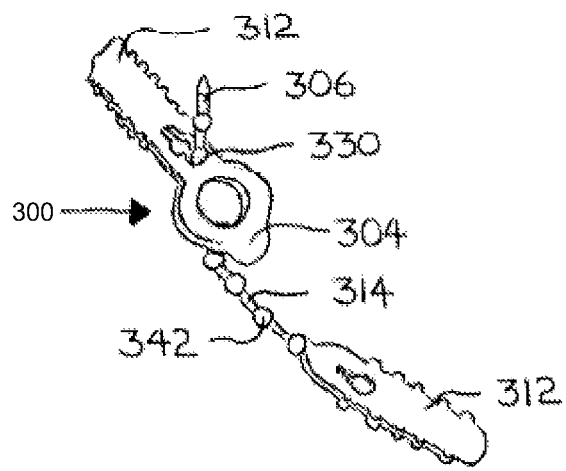
FIG. 19 is a perspective view of two exemplary utility tether accessories, the first end of one exemplary utility tether accessory interconnected with the second end of another exemplary utility tether accessory.
Figure 20:
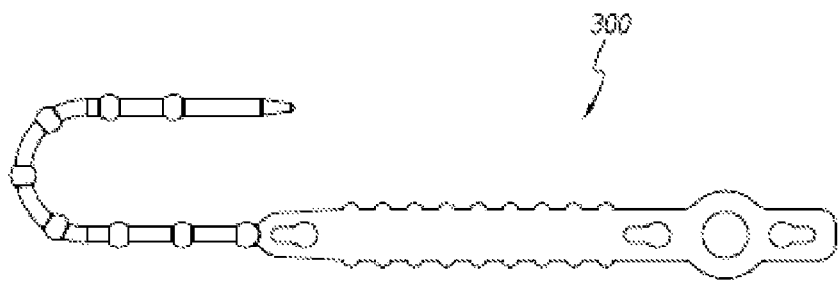
FIG. 20 is a front plan view of the exemplary utility tether accessory.
Figure 21:
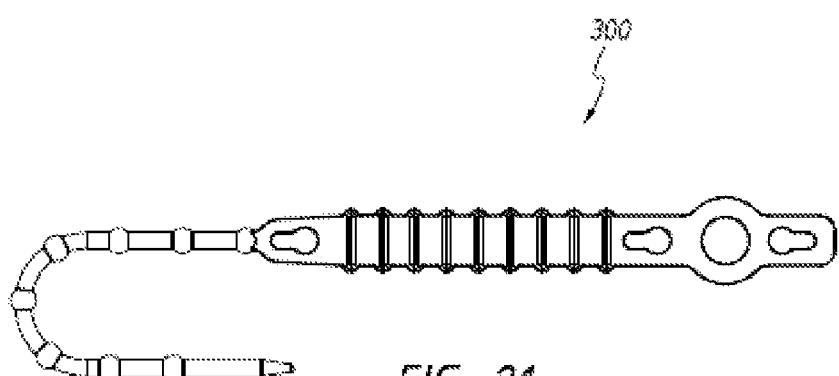
FIG. 21 is a back plan view of the exemplary utility tether accessory.
Figure 24:
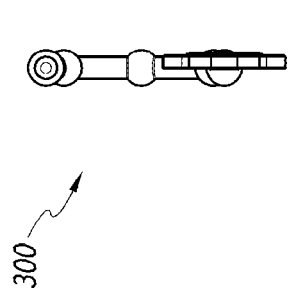
FIG. 24 is a top plan view of the exemplary utility tether accessory.
Figure 25:
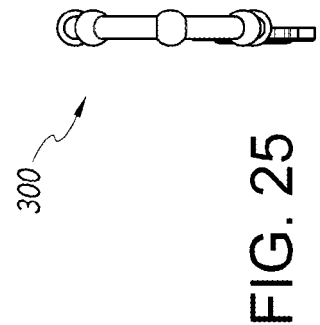
FIG. 25 is a bottom plan view of the exemplary utility tether accessory.
Figure 22:
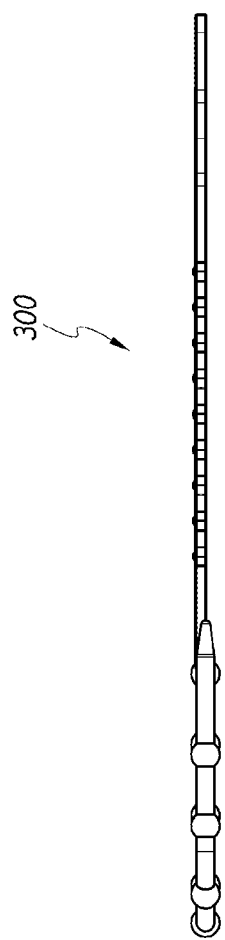
FIG. 22 is a first side view of the exemplary utility tether accessory.
Figure 23:
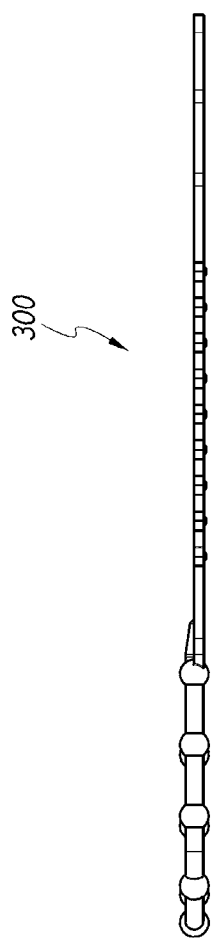
FIG. 23 is a second side view of the exemplary utility tether accessory.
Figure 28:
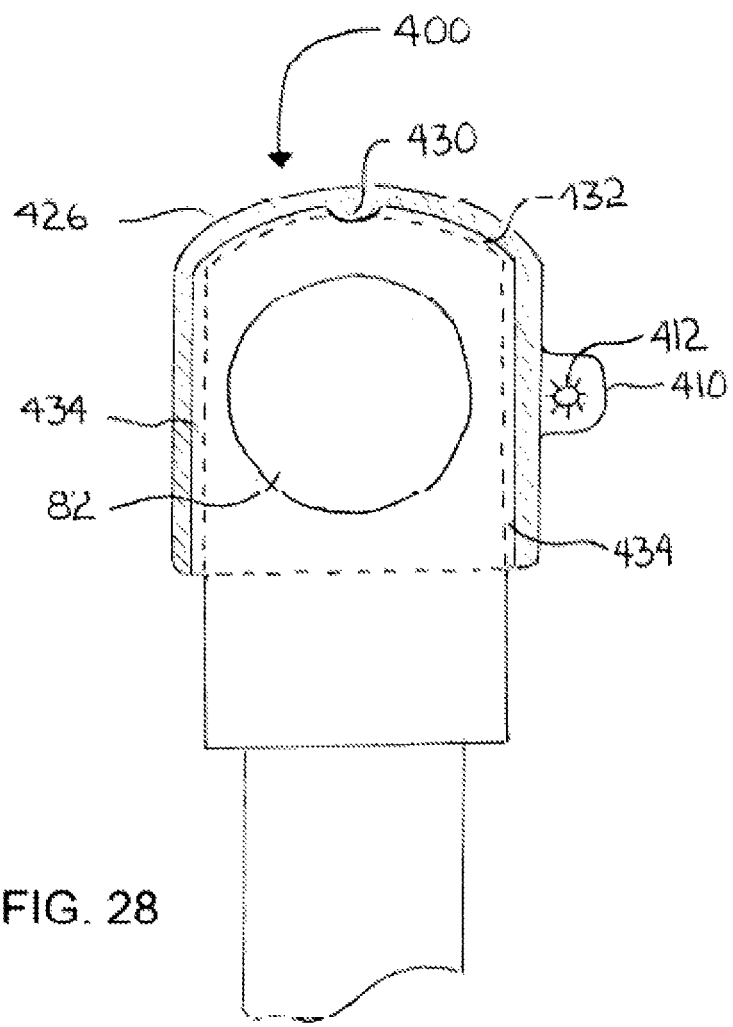
FIG. 28 is a cross-sectional top view of the exemplary utility pad accessory installed on a hitch ball mount.
Figure 29:
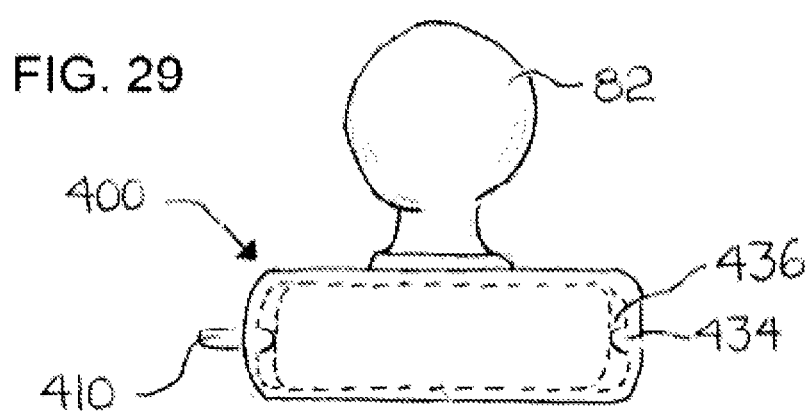
FIG. 29 is a cross-sectional side view of the exemplary utility pad accessory installed on a hitch ball mount.
Figure 31:
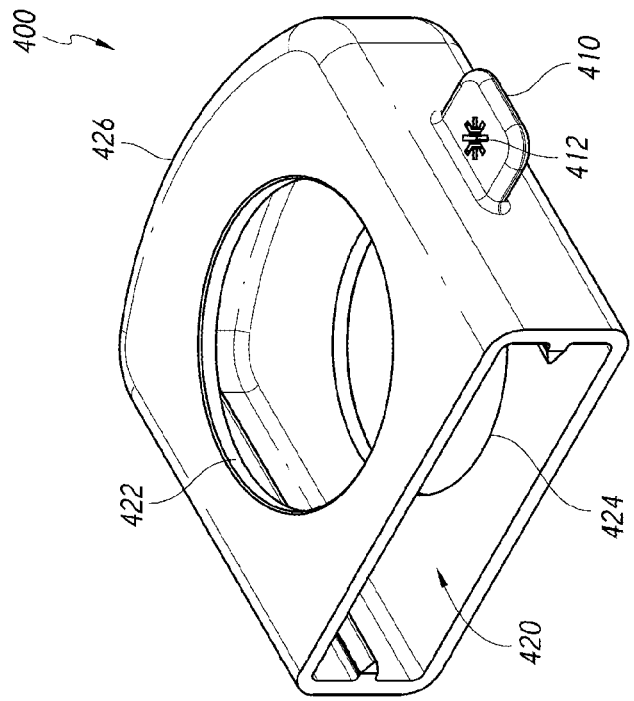
FIG. 31 is a perspective bottom view of the exemplary utility pad accessory taken from the open back.
Figure 30:
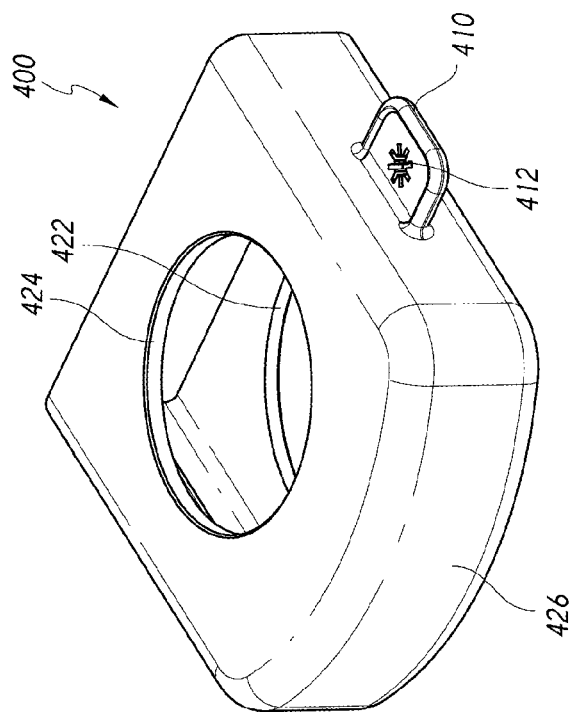
FIG. 30 is a perspective top view of the exemplary utility pad accessory taken from the curved front.
Figure 32:
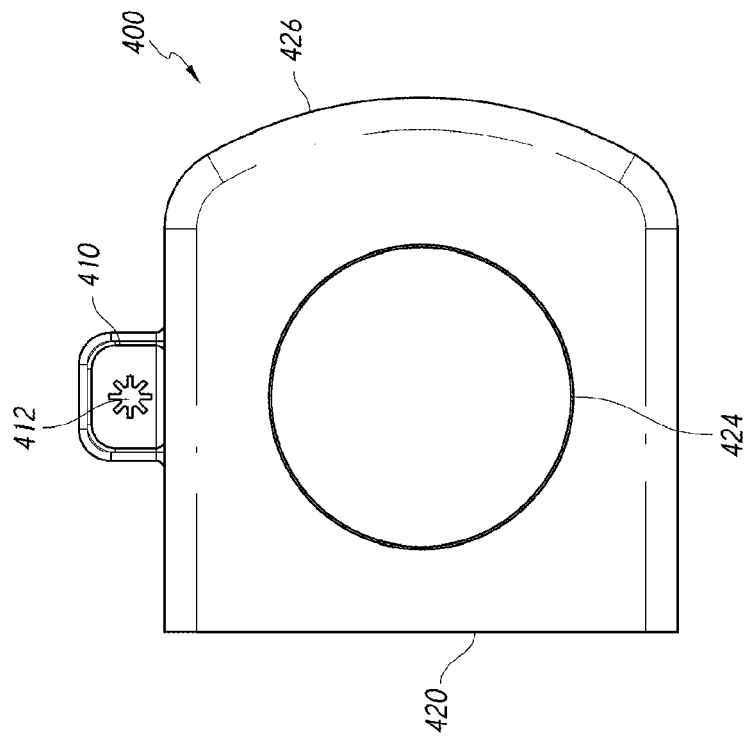
FIG. 32 is a plan bottom view of the exemplary utility pad.
Figure 33:
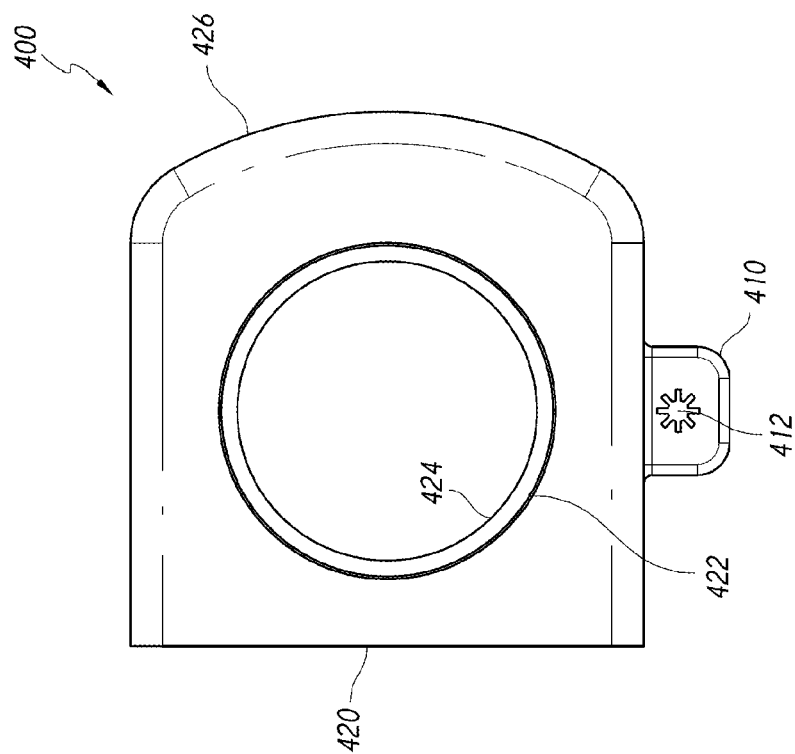
FIG. 33 is a top plan view of the exemplary utility pad.
Figure 34:
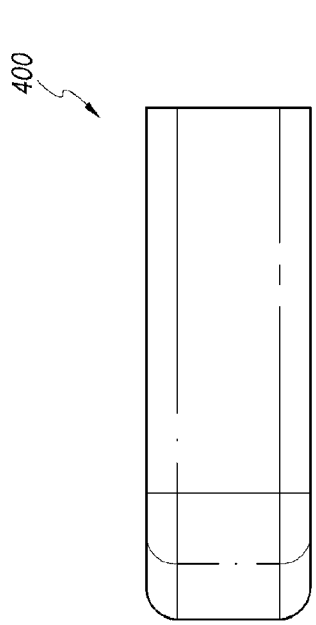
FIG. 34 is a first side view of the exemplary utility pad.
Figure 35:
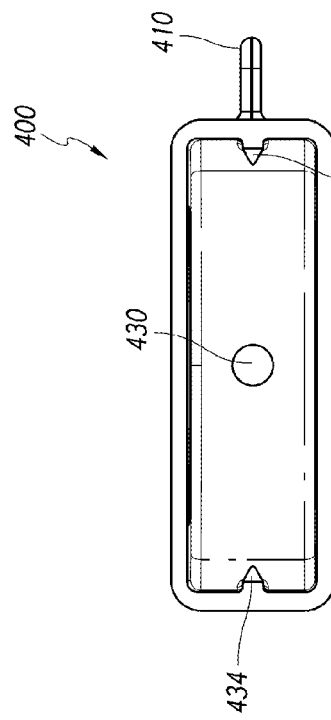
FIG. 35 is a second side view of the exemplary utility pad.
Figure 36:
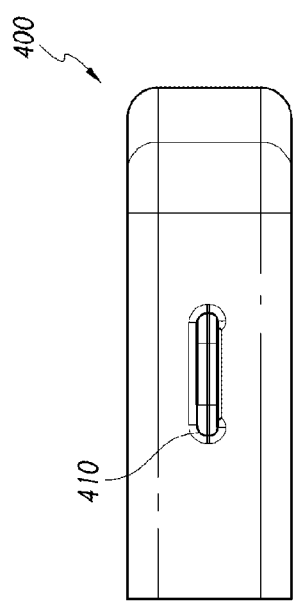
FIG. 36 is a front view of the exemplary utility pad.
Figure 37:
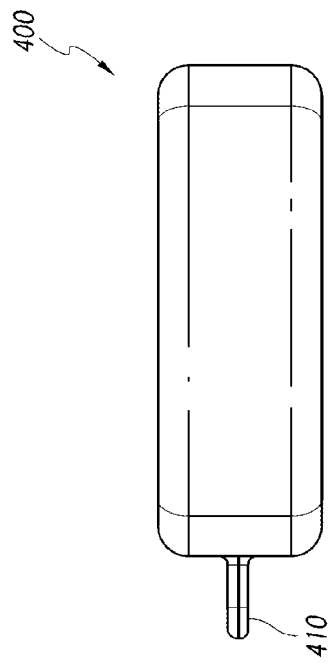
FIG. 37 is a back view of the exemplary utility pad.
Figure 38:
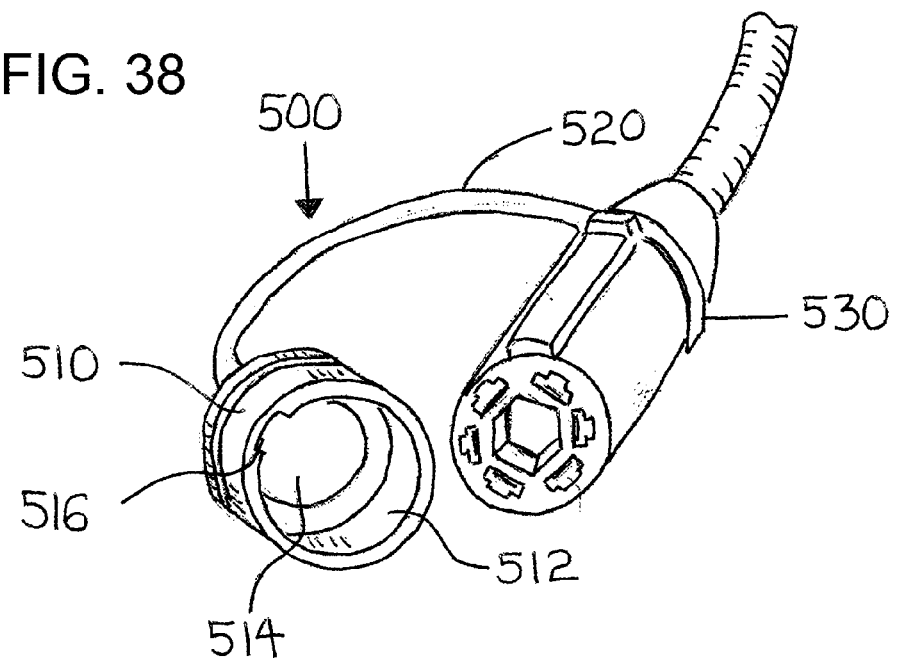
FIG. 38 is a perspective view of an exemplary seven-way connector cap accessory installed on a seven-way male plug connector.
Figure 39:
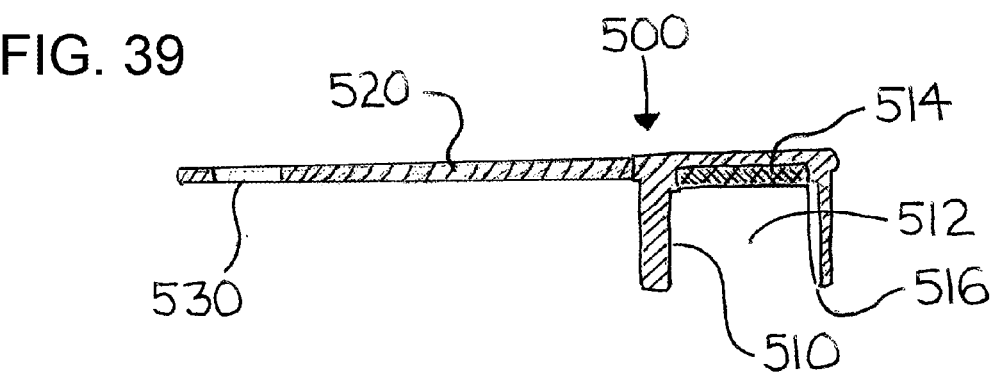
FIG. 39 is a cross-sectional side view of the exemplary seven-way connector cap accessory.
Figure 47:
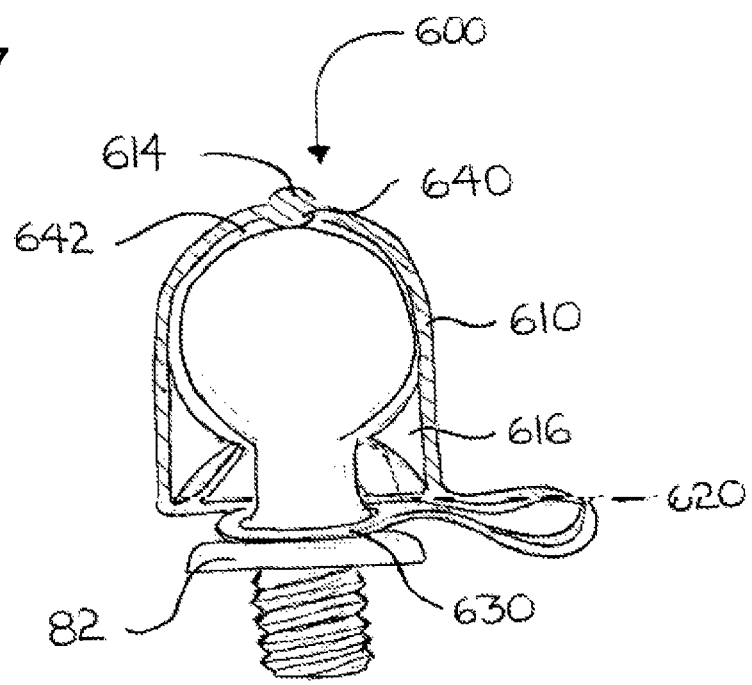
FIG. 47 is a cross-sectional side view of an exemplary hitch ball cap accessory in a first configuration.
Figure 48:
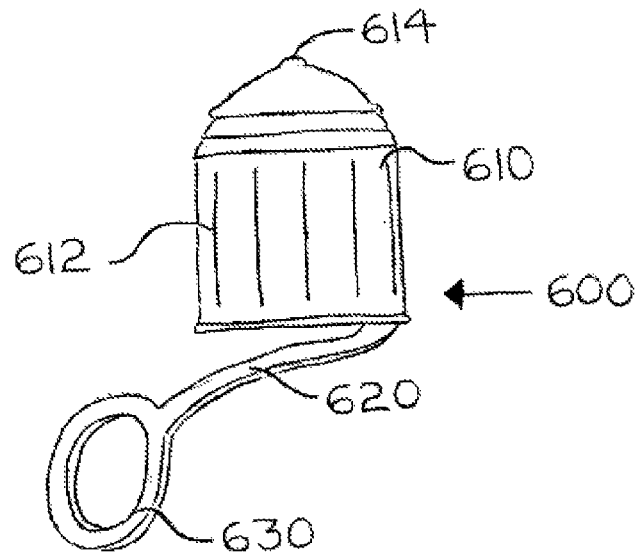
FIG. 48 is a perspective side view of the hitch ball cap accessory in the first configuration.
Figure 56:
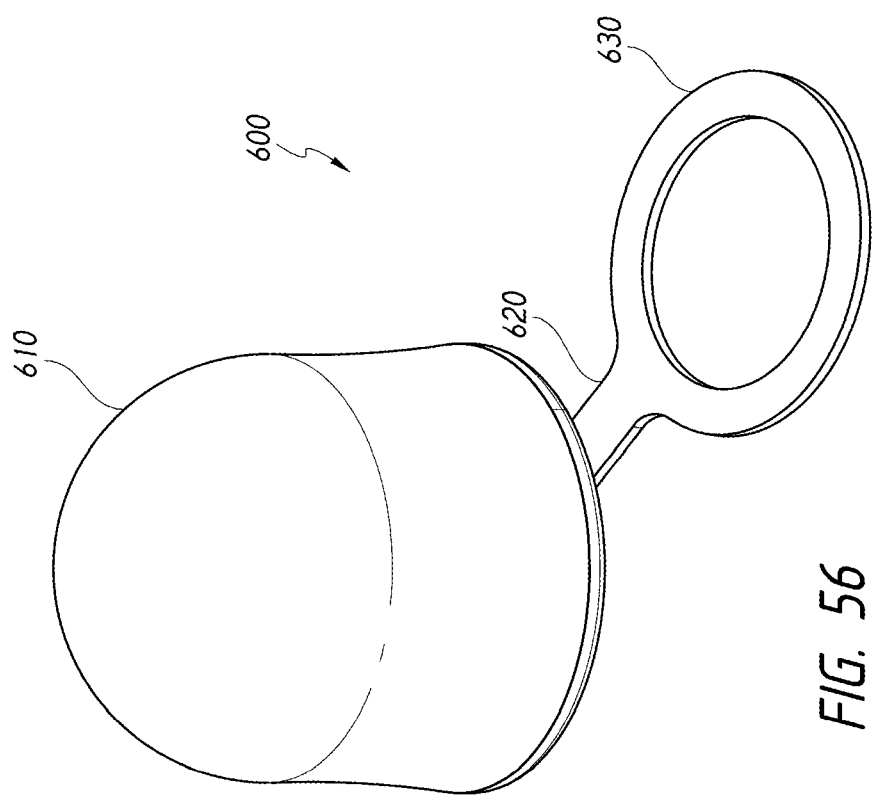
FIG. 56 is a perspective top view of the hitch ball cap accessory in a first configuration.
Figure 58:
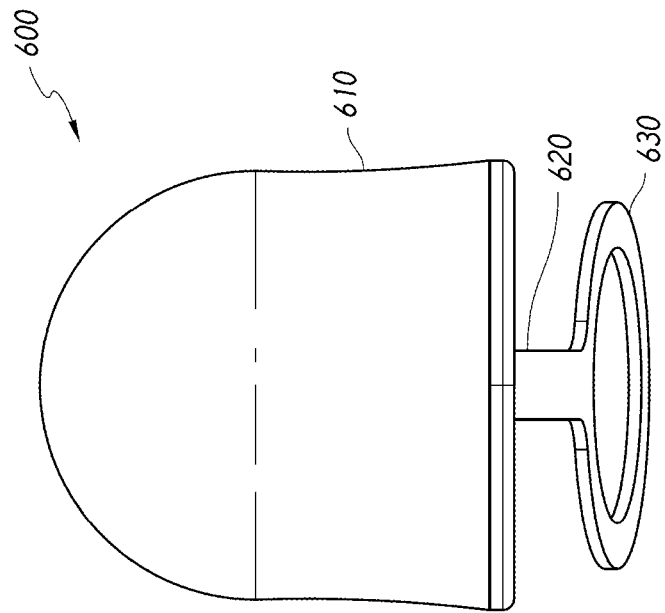
FIG. 58 is a back view of the exemplary hitch ball cap accessory in the first configuration.
Figure 57:
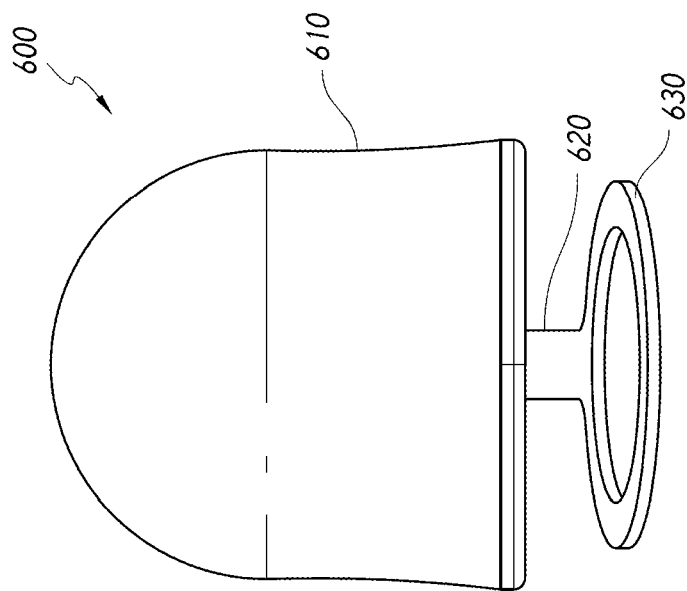
FIG. 57 is a front view of the exemplary hitch ball cap accessory in the first configuration.
Figure 59:
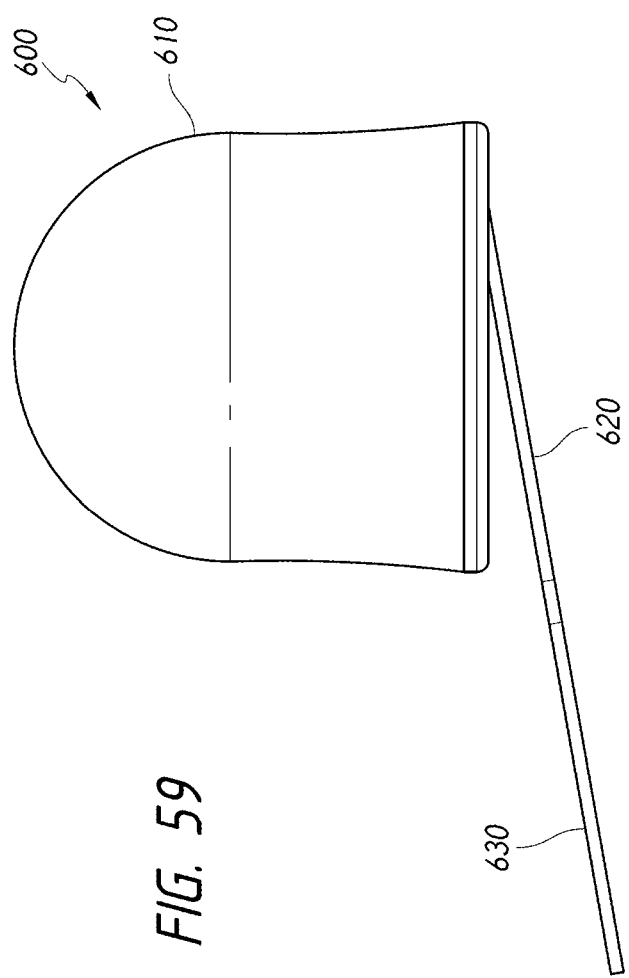
FIG. 59 is a first side view of the exemplary hitch ball cap accessory in the first configuration, the second side view being a mirror image thereof.
Figures 60, 61:
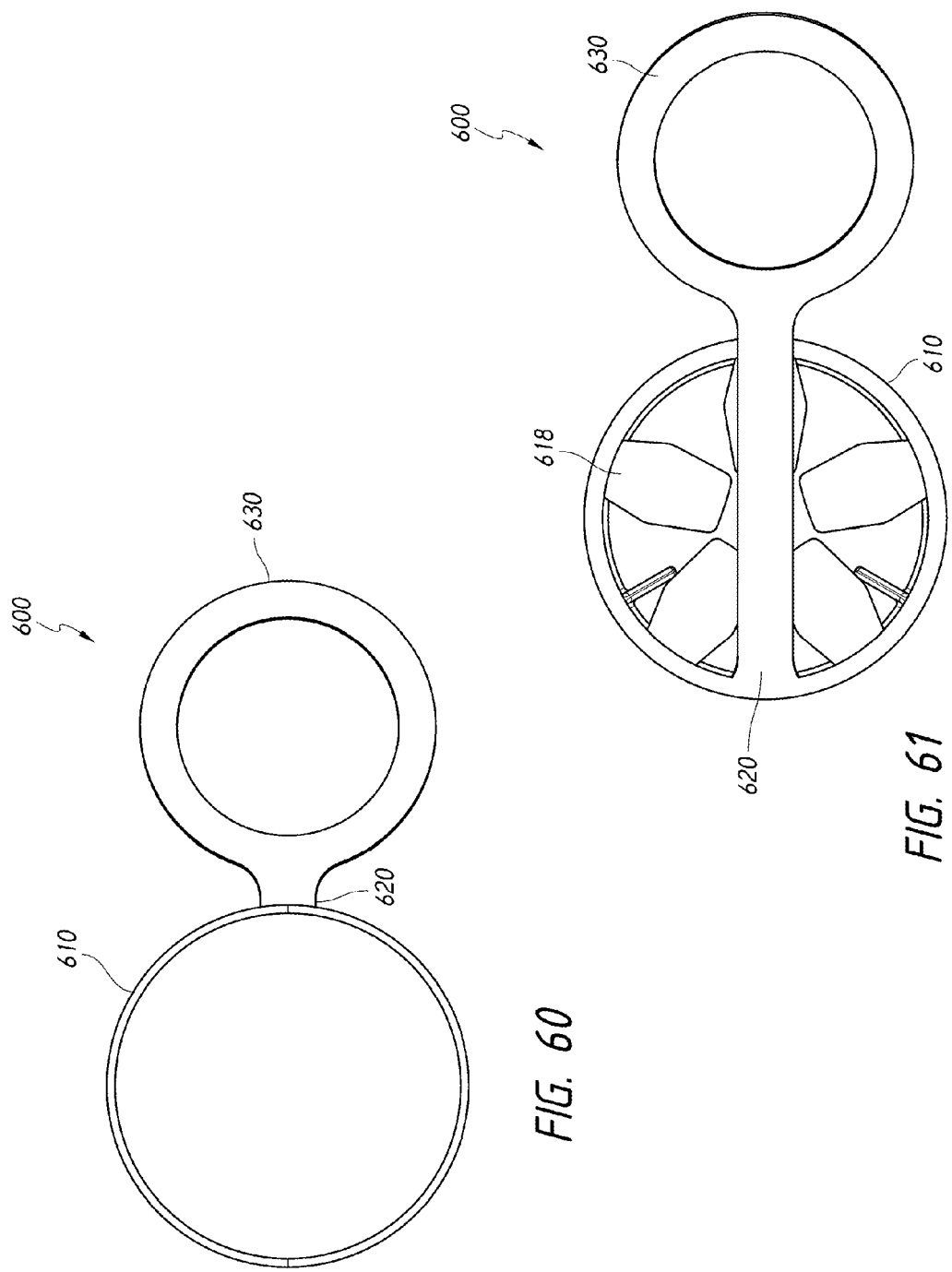
FIG. 60 is a top view of the hitch ball cap accessory in the first configuration.
FIG. 61 is a bottom view of the hitch ball cap accessory in the first configuration.

FIGS. 8-14 show a second preferred chain-up accessory 200 having a "narrow" elongated body 202 with a first end 204 and a second end 206. A central hitch ball aperture 210 is shown as a generally circular opening at least relatively centrally positioned between the first and second ends 204, 206. Toward both the first end 204 and the second end 206, on either side of the center hitch ball aperture 210, are first and second chain apertures 220, 222. FIGS. 8 and 9 show the second preferred chain-up accessory 200 attached to a hitch ball 82 with the trailer safety chains 80 secured within respective central hitch ball aperture 210. FIG. 8 shows the second preferred chain-up accessory 200 attached to a hitch ball 82 with the trailer safety chains 80 secured within respective first and second chain apertures 220, 222. FIG. 9 shows the second preferred chain-up accessory 200 removed from the hitch ball 82 with the trailer safety chains 80 still secured within respective first and second chain apertures 220, 222. FIGS. 10-14 show the second preferred chain-up accessory 200 substantially flat "at rest" (when it is not in use) configuration. As shown in FIGS. 12 and 13, the body 202 is an elongated body. The body 202 has a central longitudinal axis 224 and a maximum longitudinal length 226. The body 202 also has a maximum latitudinal width 228. The maximum longitudinal length 226 is shown as at least twice as long as the maximum latitudinal width 228.

Like the first and second hitch ball apertures 110, 112, central hitch ball aperture 210 is preferably designed to fit at least one trailer hitch ball 82 and, preferably, many trailer hitch balls 82 of different sizes. Because trailer hitch balls 82 come in many standard sizes, the second preferred chain-up accessory 200 preferably provides one or more accommodations for the different sizing including, but not limited to the following exemplary accommodations: (1) allowing user modification (cutting) of material (for example, at designated cut points) between the central hitch ball aperture 210 and stress-relief openings 214 to allow stress relief (essentially creating small flaps between the cuts, the flaps being able to bend to increase the size of the central hitch ball aperture 210 and to return to their "flat" position to return the central hitch ball aperture 210 to its regular size; and (2) using a material that has some "stretch." An example of allowing user modifications is shown as providing stress-relief openings 214 (shown as four circular openings) positioned closely around the circumference (shown as evenly spaced) of the main circle of the central hitch ball aperture 210. Cut points may be provided to indicate to the user where to cut the material. Once cut, the central hitch ball aperture 210 would have "flaps" (e.g. four "flaps" between the four stress-relief openings 214). As such, the diameter of the central hitch ball aperture 210 may be adjusted by bending the flaps so that the central hitch ball aperture 210 may be fitted around various sized hitch balls 82. In alternative second chain-up accessories 200, the central hitch ball aperture 210 does not have stress-relief openings 214. There also can be more or fewer stress-relief openings 214 (and flaps). Examples of materials that have some "stretch" are discussed in relation to the first preferred chain-up accessory 100. Although second preferred chain-up accessories 200 have one or more of these accommodations, alternative first preferred chain-up accessories 200 have no accommodations (e.g. sized to fit a specific hitch ball 82) or additional accommodations (e.g. those disclosed herein).

The first and second chain apertures 220, 222 are preferably openings through which the trailer safety chains 80 may be fed. The chain apertures 220, 222 are shown as being elongated, tapered, and designed with one end (e.g. the ends furthest from the hitch ball aperture) narrower in width so as to capture the chain(s) 80 and prevent them from sliding during use. These characteristics are meant to be exemplary and not to limit the scope of the invention. For example, the chain apertures 220, 222 are not necessarily elongated, tapered, and/or narrower at one end.

Although not shown, one or more wire apertures may be incorporated in the second preferred chain-up accessory 200. Although not shown, one or more optional spacer openings may be incorporated into the second preferred chain-up accessory 200.

Although specific sizes of preferred first and/or second chain-up accessories 100, 200 (and the hitch ball apertures 110, 112, 210, 212 thereof) are possible (e.g. specifically designed to fit a particular trailer hitch), preferred alternative chain-up accessories may be adapted to fit many trailer hitch ball sizes. The accommodations for the different sizing discussed in relation to the first and/or second chain-up accessories 100, 200 are meant to be exemplary and can be used in either version of the chain-up accessory 100, 200. For example, although the cutouts 114 are shown in relation to the first chain-up accessory 100, it is possible that cutouts would be used with a modified second chain-up accessory. In addition to those accommodations discussed above, additional accommodations that may be used alone or in combination with the other accommodations include, but are not limited to: (1) the chain-up accessory could have pre-formed perforations in the material between the hitch ball aperture and stress-relief openings, the perforation being easily breakable (no cutting necessary) to allow stress relief (essentially creating small flaps); (2) the chain-up accessory could have pre-formed perforations (e.g. in concentric circles around a hitch ball aperture) to allow easy removal of material and increase the size of the hitch ball aperture; and any other accommodation known or yet to be discovered could be used with either or both chain-up accessories 100, 200 or variations thereof.

The shown shapes and sizes are meant to be exemplary. Alternative chain-up accessories may have alternative shapes including, but not limited to geometric shapes (e.g. square, oval, octagon), "fun" shapes (e.g. star, heart, a person, a pair of hands), logos (e.g. made for a particular company), or other shapes. Alternative hitch ball apertures may have alternative shapes including, but not limited to geometric shapes (e.g. square, oval, octagon), "fun" shapes (e.g. star, heart, a person, a pair of hands), logos (e.g. made for a particular company), or other shapes. Shapes and sizes of alternative chain-up accessories and hitch ball apertures may be adapted to particular needs (e.g. size of the hitch ball 82, size of the vehicle, manufacturing costs). The chain-up accessory may be a molded part made using procedures such as plastic injection molding.

Utility Tether Accessory:

The shown utility tether accessory 300 (FIGS. 15-25) works with a padded trailer hitch on non-commercial tow vehicles, but may be used with other trailer hitches and/or other tow vehicles. A common problem is trailer wire 302 damage or wear from the wire 302 dragging on the ground while in tow. There is no current set way to secure a trailer wire 302 that connects to the tow vehicle. The utility tether accessory 300 was designed to work with the utility pad accessory and tether the trailer wire 302 to the utility pad or any other available point by which to fasten. The utility tether accessory 300 may also be designed to break away should the fastened tether pull the trailer wire 302 too tight. The utility tether accessory 300 may also be designed to be reusable.

One goal of the utility tether accessory 300 is to secure the trailer wire 302 that is otherwise prone to dragging on the ground during towing. Users can attach the wire 302 by other means, but these are neither convenient nor time saving. Current tether or cable tie designs attach to a wire 302 or other device, but only attach to a specific item such as a key, flashlight, or camera. Many cable ties need to be removed by cutting and destroying the cable tie. In the present example, the utility tether accessory 300 allows the user to attach wire(s) 302 or other devices to any item up to one inch in diameter repeatedly without having to dispose of the part. In other examples, the utility tether accessory 300 may attach wire(s) 302 or other devices to any item greater than one inch in diameter.

The shown exemplary utility tether accessory 300 has a first end 304 and a second end 306. Starting at the first end 304 and working towards the second end 306 are the following general features: a tether head 310, a tether body 312, and a tether tail 314. Associated with the tether head 310 is a thumb tab 320, a first exemplary keyhole opening 322 (that may be optional), and a large tether opening 324. Associated with the tether body 312 is a second exemplary keyhole opening 330 (that may be optional), teeth 332, and a third exemplary keyhole opening 334 (that may be optional). Associated with the tether tail 314 (also referred to as cord 314) is a rope 340, at least one ball 342 associated with the rope 340, and an arrow tip 344 at the distal end of the tether tail 314. One or more of the keyhole openings 322, 330, 334 may be double keyhole openings (with a central opening and opposing keyhole slits). The keyhole openings 322, 330, 334 may be more traditional openings.

In one example of a utility tether accessory 300, the utility tether accessory 300 consists of a large tether opening 324 (e.g. an opening, shown as a circle, but alternative shapes are possible) on one end 304 preferably near the thumb tab 320. There is a long rope or cord feature 314 with a series of balls 342 spaced apart down the length of the tail cord 314. There is an arrow or point (arrow tip 344) at the end of the cord 314 to be used as a threading tool. There are a series of bumps or teeth (teeth 332) along the tether body 312 that lock the tether head 310 (with the large tether opening 324) into place as it is ratcheted down around the wire 302 or other feature. There are two keyhole shaped features (keyhole openings 330, 334), with one possibly having a slot on each end of the opening, on the tether body 312 to allow the user to hook the cord 314 end back to the tether body 312. The keyhole shape consists of a circular opening portion slightly smaller than the size of the balls 342 on the rope 340 and a narrow slot portion the size of the cord 314. There is a third opening in the thumb tab 320 portion and two in the tether body 312. The cord 314 may be inserted through the third opening, or, alternatively, the third opening may receive a screw, nail, or other attachment member for fixing the tether to a wall. The balls 342 on the cord 314 fit through the keyhole feature and lock into the keyhole slot. The utility tether accessory 300 then allows the user to attach to a wire 302 or other round feature and attach that wire 302 to another device or apparatus of variable size. The utility tether accessory 300 also allows the user to attach it to a wall to hang wires 302 or other devices. The utility tether accessory 300 also attaches to another utility tether for many combinations of connections. Though the utility tether accessory 300 is designed to be used with the utility pad accessory it is not limited in this scope.

The user may place the utility tether accessory 300 around a wire 302 by feeding the arrow tip 344 through the large tether opening 324 of the utility tether accessory 300. This creates a loop that encircles a wire 302 or other feature (thumb tab 320 and teeth) to be tethered. The rope end or corded end is looped around a different device or feature (e.g. arrow tip 344, rope 340, and ball 342) to secure the wire 302 to another wire 302 or device. This is possible because the utility tether accessory 300 is flexible and the keyhole and ball 342 feature locks with limited slip.

Although the utility tether accessory 300 is described as being used on hitches or hitch ball mounts for family owned or recreational tow vehicles, it is not specifically limited to this application. The utility tether accessory 300 may stay on the wire 302 of the trailer. The utility tether accessory 300 may work in conjunction with another hitch pad device that provides a tab on the side of the part that gives the user a place to attach the utility tether accessory 300 with the trailer wire 302. The utility tether accessory 300 gives the user a convenient ability to attach and secure the trailer wire 302 when towing. Currently when towing a trailer, the user must have the correct length of wire 302 from the trailer to the tow vehicle. This is not practical since trailers can be used by a variety of tow vehicles and the wire 302 can drag on the ground depending on plug location.

Since the utility tether accessory 300 may be detachable, it may be reused many times. The thumb tab 320 feature allows for the user to revolve the tethered item with ease and can be reattached. The tail 312 and adjacent features (e.g. the balls 342, rope, 340, and keyhole 334) allows the user to disconnect and add additional or fewer items and reattach.

A feature of the utility tether accessory 300 is the corded ball end and keyhole feature. This allows the tether to attach to itself. The cord end with evenly spaced balls 342 could alternatively or additionally include universal or directional arrows or barbs. Instead of a keyhole style opening, a circle opening or star shaped opening could be included in the utility tether accessory 300.

The utility tether accessory 300, though intended to work with the utility pad accessory to keep the wire 302 secure while the trailer is in tow, is not limited in this scope and can be used for other means. The utility tether accessory 300 is a reusable attachment device that gives a user a convenient ability to secure wires 302, and is not limited to tow vehicle connecting wires 302. The utility tether accessory 300 is universal for use in other applications and is not limited in this scope. For example, the utility tether accessory 300 may be used for tying, securing, attaching cords, cables, tubes hoses, lights, wires 302, extension cords, communication cables, bundling, hanging bags etc., in commercial, healthcare, residential, and educational environments.

In one specific example, the utility tether accessory 300 may be used as a wire 302 hanging device, a bag tie, a mechanism for securing computer cables, and/or any need to connect, hang or secure electrical wires 302 or extension cords in a variety of environments.

In another specific example, the tether may be used in hospital applications, including, but not limited to, securing cardiac cables, IV lines, tubes, bags, electrical cords, etc. The tether may be formed from a colored material to help identify cables, tubes, hoses, and/or bags. For example, a blue color may identify saline solution, a red color may identify a pain medication, a green color may identify a nutrient solution, etc. Since the tether may be reusable, a care professional may easily adjust or remove the tether. The tether may also be designed to break away if cables or tubes are pulled with some force. For example, if a patient pulls at the cables or tubes, the tether will break away.

The shown shapes and sizes are meant to be exemplary. For example, the utility tether accessory 300 can be made larger or smaller. The shapes of the openings and other features may have alternative shapes.

The utility tether accessory 300 may be made from an elastomeric plastic material for flexibility. The utility tether accessory 300 may be a molded part, formed by plastic injection molding. The material may be a synthetic elastomeric material. Different materials can be used for added stiffness and strength. If the utility tether accessory 300 is molded, color can be added to the material mix as well as ultraviolet protection.

U.S. Pat. Nos. 4,558,495, 6,539,589, 6,151,761, 5,802,888 may be relevant to the utility tether accessory 300, as well as product literature related to the RYOBI™ chuck key holder P/N 932-772.

Utility Pad Accessory:

FIGS. 26-37 show a utility pad accessory 400, which is a trailer hitch accessory that gives protection from impact to the trailer hitch while providing a convenient attachment place for securing the trailer wire.

The utility pad accessory 400 is shown as fitting over the standard trailer hitch ball mount of a tow vehicle, with or without the hitch ball 82 attached to the ball mount, but could be adapted for other types of hitches. A common problem is a user hitting his or her shin on the trailer hitch. The utility pad accessory 400 gives the user some added protection from scrapes and/or bruises if impact occurs. The utility pad accessory 400 may be made in different colors, some of which can make the hitch more noticeable. For example, the utility pad accessory 400 may be yellow or orange. Another common problem is trailer wire damage and/or wear from the trailer wire dragging on the ground while in tow. There is no current set way to secure the trailer wire that connects to the tow vehicle. The utility pad accessory 400 has a tab that gives the user a convenient place for attachment of a tether to secure the trailer wire.

The utility pad accessory 400 is a cover for a hitch or hitch ball mount to provide padding from impact of a person's lower leg area. The utility pad accessory 400 may be made of an elastomeric material that allows the user to place or stretch the utility pad accessory 400 over the hitch or hitch ball mount. The utility pad accessory 400 also employs a tab feature 410 to hook or tether a trailer wire to it. This can be done with a wire, a string, or, preferably, a utility tether accessory 300.

In one example of a utility pad accessory 400, the utility pad accessory 400 consists of an open square end 420 that stretches over the hitch ball 82 and hitch end. There are two openings (shown as circular openings 420 and 422) in the center of the utility pad accessory 400, one being larger than the other for different sized towing hitch balls 82. There is a rounded face 426 that can have molded-in logos or designs. There is a tab 410 with a center star shaped opening 412 to hook a tether or other tie type device to secure the trailer wire. There is a center stand-off bump 430 on the inside of the part this creates an air pocket 432 with the ribs 434 also creating an air pocket 436 above and below the rib. This combined with the elastomeric material creates a soft cushion or crush zone in the event of impact.

The utility pad accessory 400 may be a molded part, made by plastic injection molding. The material may be a synthetic elastomeric material or rubber. The user may place the part over the hitch or hitch ball mount. This is possible because, in this example, the material is flexible. In some cases of larger sizes it may be necessary to remove the hitch ball 82 and nut from the hitch.

The utility pad accessory 400 is shown as being used with hitches or hitch ball mounts. The utility pad accessory 400 may stay on the hitch or hitch ball mount even if the hitch is removed from the tow vehicle. The utility pad accessory 400 provides at least some impact resistance due to the geometry and design of the part. The utility pad accessory 400 has contact points that create an air pocket that, in turn, creates a cushion.

Because the utility pad accessory 400 may be molded, color can be added to the material mix as well as ultraviolet protection. Since the utility pad accessory 400 does not require foam, softer materials, or size to aid in impact resistance, the utility pad accessory 400 can be made smaller and more attractive. The tab feature 410 offers the user an attachment point to secure the trailer wire when towing. Currently when towing a trailer, the user must have the correct length of wire from the trailer to the tow vehicle, and even with this example, the wire should preferably be secured. This is not practical since trailers can be used by a variety of tow vehicles and the wire can drag on the ground depending on plug location, hitch or hitch ball mount length. The utility pad accessory 400 can also be molded with logo's or advertising that would be difficult to wear off or be removed by weather or abrasion.

The utility pad accessory 400 has a tab feature 410 on the left side of the part. This can be added to both sides of the part. Lights may be added for breaking or backing up of the tow vehicle. Glow in the dark plastic may be used to illuminate the product. Further, additional crush zones may be added. The part may be decorated in camouflage, chrome or any other pattern or color.

The utility pad accessory 400 may be molded in color for easy reference to avoid impact with the hitch or hitch ball mount. The utility pad accessory 400 provides at least some impact resistance form the lower leg area hitting the hitch due to the geometry and design of the part. Other products are bigger and bulkier.

U.S. Patent Publication No. 2003/0085548, U.S. Patent Publication No. 2009/0200771, and U.S. Patent Publication No. 2010/0025965, U.S. Pat. No. 2,671,675, U.S. Pat. No. 4,955,968, U.S. Pat. No. 5,037,122, U.S. Pat. No. 5,421,601, U.S. Pat. No. 6,039,339, and U.S. Pat. No. 6,412,876 may be relevant to the utility pad accessory 400.

Seven-Way Connector Cap:

FIGS. 38-46 show a seven-way connector cap accessory 500, which gives protection from corrosion of plug contacts, from bugs, from dirt, and from other debris getting into the trailer connecting plug (e.g. a seven-way male plug connector, also referred to as a "plug"). The seven-way connector cap accessory 500 is a cap that may include a tether 520 and loop 530 that attaches to the body 510 (also referred to as cap portion 510) of the connector. The seven-way connector cap accessory 500 is used on trailers (e.g. utility trailers, box trailers, cargo trailers, etc.) using the trailer connecting plug. Not all trailers are equipped with this style of trailer connecting plug, but most new tow vehicles designed for towing use this type of trailer connecting plug. The trailer connecting plug is prone to dirt and bugs getting into the recessed areas of the plug. The plug also is prone to corrosion from weather exposure. The seven-way connector cap accessory 500 limits or prevents this from occurring. The seven-way connector cap accessory 500 is used when the trailer is in storage and not while the trailer is in tow. The magnet 514 allows the user to attach the trailer connecting plug to the frame of the trailer to keep it off the ground.

The seven-way connector cap accessory 500 fits over a trailer connecting plug for a trailer connection to a tow vehicle. These trailer connecting plug styles are common on all new non-commercial tow vehicles designed for towing. The seven-way connector cap accessory 500 may be used to keep out unwanted debris when the trailer is not being used. A common problem when the trailer is in storage is bugs nesting in the contact points of the connector. As a result one or more lights of the trailer my not work properly. The seven-way connector cap accessory 500 fits tightly over the trailer connecting plug to keep out bugs and dirt. The seven-way connector cap accessory 500 additionally may have a tether 520 that connects to the trailer connecting plug.

In one example, the seven-way connector cap accessory 500 is a cover for a trailer connecting plug. It is designed to fit, specifically, a trailer connecting plug. The exemplary seven-way connector cap accessory 500 consists of a cap portion 510 and a tether 520 cord with a loop 530.

The shown seven-way connector cap accessory 500 includes a magnet 514. As shown, a cavity 512 in the cap portion 510 allows for the over mold or insertion of a magnet 514. In addition magnet 514 (or instead of magnet 514), one or more magnet could be positioned elsewhere in the seven-way connector cap accessory 500. For example, alternative locations might be on the side of the cap portion 510 or associated with the tether 520.

The shown exemplary trailer connecting plug has a raised key feature on the outer round of the body running length wise to the face, and the seven-way connector cap accessory 500 has a key slot feature 516 on the inside of the cap portion 510, which keeps the cap portion 510 from rotating and forms the seal of the cap portion 510. The key slot feature 516 is an optional feature. Using a more flexible material, for example, would allow the elimination of the key slot feature while still providing a seal. A possible material replacement could be silicon.

The exemplary tether loop 530 portion fits around the body of the trailer connecting plug behind the key feature to hold the cap portion 510 to the trailer connecting plug. The cap portion 510 may include a magnet 514. The magnet 514 may be held in place by means of over molding the plastic around the magnet 514 or by a secondary operation of inserting the magnet 514 into a cavity of similar diameter to the magnet 514 creating an interference fit. The magnet 514 allows the user to attach the trailer connecting plug to the trailer in order to keep the trailer connecting plug up and off the ground.

The seven-way connector cap accessory 500 may be a molded part, made by plastic injection molding. The magnet 514 may be over-molded during the injection molding process or inserted as a secondary process.

Because the seven-way connector cap accessory 500 may provide a seal around the trailer connecting plug, it performs as any cap portion 510 seal would. The result would be plug contacts free of obstruction that improves the electrical connection between the trailer and the tow vehicles to which it is attached.

The seven-way connector cap accessory 500 may be made with glow-in-the-dark plastic. Further, the seven-way connector cap accessory 500 (or parts thereof) can be decorated in camouflage, chrome or any other pattern or color. Although the portions of the seven-way connector cap accessory 500 that interact with the trailer connecting plug may require the seven-way connector cap accessory 500 to have certain size and shape restrictions, features including, but not limited to, the outer shape of the seven-way connector cap accessory 500 and the length of the tether 520 may be modified without changing the scope of the invention.

U.S. Pat. Nos. D629,366 and 6,083,016 may be relevant to the seven-way connector cap accessory 500.

Hitch Ball Cap Accessory:

FIGS. 47-61 show an exemplary hitch ball cap accessory 600. The hitch ball cap accessory 600 fits over the standard trailer hitch and trailer hitch balls 82 of non-commercial tow vehicles, but could be adapted for other tow vehicles. A common problem is wear of a trailer towing hitch ball 82. Many users fail to put or keep grease on the towing hitch ball 82 (a conductive type grease is used to encourage a good electrical connection and prevent corrosion). This is a wear surface made from metal. Without grease the hitch ball 82 wears down and can reduce conductivity for those types of trailers that use the hitch ball 82 as a ground path to the tow vehicle. In addition, if the user does use grease, there is a potential for the grease to transfer to the user and into the vehicle. Since the hitch or hitch ball mount holding the hitch ball 82 is removed and placed in the tow vehicle, the grease could inadvertently wipe off onto the tow vehicle carpeting and/or other items. The hitch ball cap cover allows the user to keep the cap on the hitch ball 82 and with the hitch and/or hitch ball mount. For reasons explained herein, this hitch ball cap accessory 600 is different from other hitch ball cap covers in that it may stay with the hitch or hitch ball mount via a tether. Further, it is easy to remove and put on. Other hitch ball covers are difficult to remove, and wipe the grease off the hitch ball 82 when removed and need to be stored when a trailer is being towed.

The hitch ball cap accessory 600 is a cover for a trailer hitch towing hitch ball 82. In one example, the hitch ball cap accessory 600 consists of a dome or cup-shaped body 610 and a tether portion 620 extending from inside the body 610 and making a loop portion 630 to be fitted over the hitch ball 82. In this example, there are optional grip ribs 612 around the outer body 610 and a button shape 614 at the head of the dome of the cup-shaped body 610. On the inner body wall portion, there are three inner ribs 616 that are shown as being triangular in shape and press on the underside of the hitch ball 82. The pressure from the inner ribs 616 holds the hitch ball cap cover to the hitch ball 82 and prevents it from coming off during normal operation of the tow vehicle. There are five finger tabs 618 that center the hitch ball cap accessory 600 to the hitch ball 82 by pushing against the bottom rounded portion of the towing hitch ball 82. There may also be a gate vestige 240 that pushes on the top portion of the towing hitch ball 82 creating an air pocket 242. Because of the limited contact to the towing hitch ball 82, this may prevent the removal of the grease and trapping of moisture.

The hitch ball cap accessory 600 may be a molded part, made by plastic injection molding. In this process an elastomeric material is injected into a mold and the part is removed and left to cool.

The hitch ball cap accessory 600 may be used on hitches or hitch ball mounts for family-owned or recreational tow vehicles, or other tow vehicles. The hitch ball cap accessory 600 may stay on the hitch ball 82 of the hitch or hitch ball mount even if the hitch is removed from the tow vehicle. The hitch ball cap accessory 600 may provide a grease guard against accidental contact with the hitch ball 82. It may also provide a weather protective cover that is convenient to the user.

Because the hitch ball cap accessory 600 may be molded, color can be added to the material mix as well as ultraviolet protection. A number of devices have been developed to cover the trailer hitch ball 82. Many can be found that are manufactured via a vinyl dipped process that relies on the shape to create an interference fit to the hitch ball diameter that creates a vacuum when the user tries to remove it. Further, this interference fit also removes the grease from the hitch ball 82. Since the hitch ball cap accessory 600 only has four small contact points with the hitch ball 82, the grease is not removed and water or moisture is not trapped inside the cap. Because the hitch ball cap has limited contact with the hitch ball 82, it does not create a vacuum and can be removed more easily than other caps commonly used.

The hitch ball cap accessory 600 may have variations in color and/or grip features. Further, tethers on the hitch ball cap accessory 600 may be round or of a different shape and/or length.

U.S. Pat. Nos. 5,658,804, 5,407,219, and 5,037,122 may be relevant to the hitch ball cap accessory 600.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not.

All references (including, but not limited to, patents and patent application publications cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A chain-up accessory for holding at least one trailer safety chain associated with a tow vehicle and trailer, said chain-up accessory comprising:

(a) a body having a first end and a second end;

(b) at least one hitch ball aperture defined in said body between said first end and said second end, said at least one hitch ball aperture being two hitch ball apertures; and (c) at least one chain aperture defined in said body between said first end and said second end;

(d) wherein said chain-up accessory holds the at least one trailer safety chain inserted through said at least one chain aperture.

2. The chain-up accessory of claim 1, said body being a flexible body.

3. The chain-up accessory of claim 1 providing at least one accommodation for accommodating hitch balls of different sizes.

4. The chain-up accessory of claim 1, a first hitch ball aperture being positioned towards said first end and a second hitch ball aperture positioned generally centrally in said body.

5. The chain-up accessory of claim 1, said at least one chain aperture positioned between said at least one hitch ball aperture and one of said first end or said second end.

6. The chain-up accessory of claim 1, further comprising at least one wire aperture.

7. The chain-up accessory of claim 1, further comprising at least one wire aperture, said at least one chain aperture being two chain apertures, at least one wire aperture positioned between said two chain apertures.

8. The chain-up accessory of claim 1, said body being a stretchable body.

9. The chain-up accessory of claim 1, said two hitch ball apertures and said at least one chain aperture being arranged substantially along a central longitudinal axis of said body.

10. A chain-up accessory for holding at least one trailer safety chain associated with a tow vehicle and trailer, said chain-up accessory comprising:
(a) a body having a first end and a second end;
(b) at least one hitch ball aperture defined in said body between said first end and said second end;
(c) at least one chain aperture chain aperture defined in said body between said first end and said second end; and
(d) said body being an elongated body having a maximum longitudinal length and a maximum latitudinal width, said maximum longitudinal length being at least twice as long as said maximum latitudinal width;
(e) wherein said chain-up accessory holds the at least one trailer safety chain inserted through at least one of the chain apertures.

11. The chain-up accessory of claim 10, said body being a flexible body.

12. The chain-up accessory of claim 10, providing at least one accommodation for accommodating hitch balls of different sizes.

13. The chain-up accessory of claim 10, further comprising at least one wire aperture.

14. The chain-up accessory of claim 10, said at least one chain aperture being a plurality of chain apertures, said at least one hitch ball aperture and said plurality of chain apertures being arranged substantially linearly.

15. A chain-up accessory for holding at least one trailer safety chain associated with a tow vehicle and trailer, said chain-up accessory comprising:
(a) a body having a first end and a second end;
(b) at least one hitch ball aperture defined in said body between said first end and said second end; and
(c) a first chain aperture and a second chain aperture defined in said body, said first chain aperture positioned between said at least one hitch ball aperture and said first end, said second chain aperture positioned between said at least one hitch ball aperture and said second end;
(d) wherein said at least one trailer safety chain may be inserted through at least one of the chain apertures.

16. The chain-up accessory of claim 15, said body being a flexible body.

17. The chain-up accessory of claim 15, providing at least one accommodation for accommodating hitch balls of different sizes.

18. The chain-up accessory of claim 15, further comprising at least one wire aperture.

19. The chain-up accessory of claim 15, said body being an elongated body having a maximum longitudinal length and a maximum latitudinal width, said maximum longitudinal length being at least twice as long as said maximum latitudinal width.

20. The chain-up accessory of claim 15, said at least one hitch ball aperture, said first chain aperture, and said second chain aperture being arranged substantially along a central longitudinal axis of said body.

21. The chain-up accessory of claim 15, said at least one hitch ball aperture, said first chain aperture, and said second chain aperture being arranged substantially linearly.

22. A chain-up accessory for holding at least one trailer safety chain associated with a tow vehicle and trailer, said chain-up accessory comprising:
(a) a body having a first end and a second end, said body being a flexible body selected from the group consisting of a rubber flexible body and a synthetic elastomeric flexible body;
(b) at least one hitch ball aperture defined in said body between said first end and said second end; and
(c) at least one chain aperture defined in said body between said first end and said second end;
(d) wherein said chain-up accessory holds the at least one trailer safety chain inserted through said at least one chain aperture.

23. The chain-up accessory of claim 22, providing at least one accommodation for accommodating hitch balls of different sizes.

24. The chain-up accessory of claim 22, said body being a stretchable body.

25. The chain-up accessory of claim 22, said at least one hitch ball aperture and said at least one chain aperture being arranged substantially along a central longitudinal axis of said body.

26. The chain-up accessory of claim 22, said body being an elongated body having a maximum longitudinal length and a maximum latitudinal width, said maximum longitudinal length being at least twice as long as said maximum latitudinal width.

27. A chain-up accessory for holding at least one trailer safety chain associated with a tow vehicle and trailer, said chain-up accessory comprising:
(a) a body having a first end and a second end;
(b) at least one hitch ball aperture defined in said body between said first end and said second end, said at least one hitch ball aperture having a perimeter, a plurality of cutouts positioned along said perimeter of said at least one hitch ball aperture, and a plurality of flaps formed between said cutouts; and
(c) at least one chain aperture defined in said body between said first end and said second end;
(d) wherein said chain-up accessory holds the at least one trailer safety chain inserted through said at least one chain aperture.

28. The chain-up accessory of claim 27, said plurality of cutouts and said plurality of flaps providing at least one accommodation for accommodating hitch balls of different sizes.

29. The chain-up accessory of claim 27, said body being a stretchable body.

30. The chain-up accessory of claim 27, said at least one hitch ball aperture and said at least one chain aperture being arranged substantially along a central longitudinal axis of said body.

31. The chain-up accessory of claim 27, said body being an elongated body having a maximum longitudinal length and a maximum latitudinal width, said maximum longitudinal length being at least twice as long as said maximum latitudinal width.

* * * * *